United States Patent
Takei

(10) Patent No.: US 11,402,652 B2
(45) Date of Patent: Aug. 2, 2022

(54) OPTICAL UNIT WITH SHAKE CORRECTION FUNCTION

(71) Applicant: NIDEC SANKYO CORPORATION, Nagano (JP)

(72) Inventor: Hiromitsu Takei, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 169 days.

(21) Appl. No.: 16/988,969

(22) Filed: Aug. 10, 2020

(65) Prior Publication Data

US 2021/0041715 A1    Feb. 11, 2021

(30) Foreign Application Priority Data

Aug. 9, 2019  (JP) .............................. JP2019-147311

(51) Int. Cl.
*G02B 27/64* (2006.01)
*G02B 7/02* (2021.01)
*G03B 5/00* (2021.01)

(52) U.S. Cl.
CPC ........... *G02B 27/646* (2013.01); *G02B 7/026* (2013.01); *G03B 5/00* (2013.01); *G03B 2205/0007* (2013.01)

(58) Field of Classification Search
CPC ...... G02B 7/026; G02B 27/646; G02B 27/64; G03B 2205/0007; G03B 5/00; G03B 5/02
USPC ....................................................... 359/822
See application file for complete search history.

(56) References Cited

U.S. PATENT DOCUMENTS

| | | | | |
|---|---|---|---|---|
| 10,976,640 B2* | 4/2021 | Minamisawa | ........... | G02B 7/02 |
| 2006/0093339 A1* | 5/2006 | Umezu | .................. | G03B 17/02 |
| | | | | 396/55 |
| 2015/0362695 A1* | 12/2015 | Shihoh | ................ | H04N 5/2254 |
| | | | | 359/813 |
| 2017/0285364 A1* | 10/2017 | Isaka | ...................... | G03B 17/12 |
| 2018/0284566 A1* | 10/2018 | Minamisawa | ..... | H04N 5/23287 |
| 2018/0284567 A1* | 10/2018 | Minamisawa | ........... | G02B 7/02 |
| 2021/0041717 A1* | 2/2021 | Takei | .................. | G03B 17/561 |
| 2021/0240000 A1* | 8/2021 | Kasahara | ........... | H04N 5/23287 |

FOREIGN PATENT DOCUMENTS

JP    2018169496 A    11/2018

* cited by examiner

*Primary Examiner* — William R Alexander
(74) *Attorney, Agent, or Firm* — Cantor Colburn LLP

(57) ABSTRACT

A retainer of a rotation support structure may include an outer protrusion on the outer circumference side of a spherical-object holding hole and an inner protrusion on the inner circumference side thereof. The outer protrusion may be in contact with a plate-holder circular arc wall of a plate-holder annular portion, and the inner protrusion may be in contact with a plate-roll annular wall of a plate-roll annular portion. When the plate-roll annular portion and the plate-holder annular portion shift with respect to the identical axis, the relative movement between the plate-roll annular portion and the plate-holder annular portion in the radial direction may be transmitted to a spherical object via the outer protrusion. Also, the relative movement may be transmitted to the spherical object via the inner protrusion, which makes the spherical object active.

8 Claims, 13 Drawing Sheets

OPTICAL UNIT WITH SHAKE CORRECTION FUNCTION

CROSS REFERENCE TO RELATED APPLICATION

The present invention claims priority under 35 U.S.C. § 119 to Japanese Application No. 2019-147311 filed on Aug. 9, 2019, the entire content of which is incorporated herein by reference.

BACKGROUND

Field of the Invention

At least an embodiment of the present invention relates to an optical unit with a shake correction function to rotate an imaging module around three predetermined axes so as to correct the shake.

Description of the Related Art

The optical unit with a shake correction function disclosed in Japanese Patent Application Publication No. 2018-169496 includes a rotation support structure that supports a movable body rotatably around a predetermined axis. The rotation support structure includes: a holder-side facing portion provided in a holder to support the movable body; a securing-body side facing portion provided in a securing body and facing the holder-side facing portion; and a rotation structure that allows the holder-side facing portion to rotate relative to the securing-body side facing portion. The rotation structure includes: a plurality of spherical objects that roll in contact with the holder-side facing portion and the securing-body side facing portion; and a retainer including a plurality of spherical-object holding holes to house the spherical objects in a rollable manner. The retainer is disposed between the holder-side facing portion and the securing-body side facing portion. The rotation structure includes a pressurization structure that biases the holder so as to bias the holder-side facing portion toward the securing-body side facing portion.

In the rotation support structure including two members and a plurality of spherical objects rolling between the two members, each of the spherical objects is always in contact with the two members to apply the force so as to bring the two members closer to each other. In the case of the application of such a force, however, the spherical object disposed between the two members may adhere to each of the members, which results in the interference of rolling of the spherical object. The interference of rolling of the spherical object causes the unsmooth rotation of the movable body supported by the rotation support structure.

In consideration of the above-described point, at least an embodiment of the present invention has an object to provide an optical unit with a shake correction function that allows the smooth rotation of a movable body with a rotation support structure.

SUMMARY

In order to solve the above-described disadvantage, an optical unit with a shake correction function according to at least an embodiment of the present invention may include a movable body including a lens; a rotation support structure to support the movable body rotatably around an optical axis of the lens, the rotation support structure including a plate roll secured to the movable body; a plate holder including a facing portion facing the plate roll in a direction of the optical axis; and a rotation structure to allow rotation of the plate roll relative to the plate holder, the plate roll including a plate-roll annular portion that is coaxial with the optical axis. The plate holder may include, as the facing portion, a plate-holder annular portion facing the plate-roll annular portion. The rotation structure may include three or more spherical objects to roll in contact with the plate-roll annular portion and the plate-holder annular portion; a retainer in an annular shape including a plurality of spherical-object holding holes to rollably house the three or more spherical objects, respectively, and disposed between the plate-roll annular portion and the plate-holder annular portion; and a pressurization structure to generate a force that makes the plate-roll annular portion and the plate-holder annular portion close to each other. One of the plate-roll annular portion and the plate-holder annular portion may include an outer wall extending in the direction of the optical axis, from an outer circumference edge toward the plate-roll annular portion, the plate-holder annular portion including an inner wall extending in the direction of the optical axis, from the outer circumference edge toward the plate-roll annular portion, and the plate-roll annular portion including the inner wall extending in the direction of the optical axis, from the inner circumference edge toward the plate-holder annular portion. The retainer may include an outer protrusion protruding to an outer circumference side from an outer retainer portion disposed on an outer side in a radial direction of each of the plurality of spherical-object holding holes and contacting with the outer wall, and an inner protrusion protruding to an inner circumference side from an inner retainer portion disposed on an inner side in the radial direction of each of the plurality of spherical-object holding holes and contacting with the inner wall.

According to at least an embodiment of the present invention, the retainer disposed between the plate-roll annular portion and the plate-holder annular portion may include the outer protrusion on the outer circumference side of the spherical-object holding hole and the inner protrusion disposed on the inner circumference side of the spherical-object holding hole. The outer protrusion may be in contact with the outer wall provided in one of the plate-roll annular portion and the plate-holder annular portion. The inner protrusion may be in contact with the inner wall provided in the other of the plate-roll annular portion and the plate-holder annular portion. Therefore, for example, when the plate-roll annular portion and the plate-holder annular portion shift with respect to the identical axis position due to a change in the posture of the rotation support structure, the relative movement between the plate-roll annular portion and the plate-holder annular portion in the radial direction is transmitted to the spherical object from the outer wall via the outer protrusion and the outer retainer portion. Furthermore, the relative movement between the plate-roll annular portion and the plate-holder annular portion in the radial direction is transmitted to the spherical object from the inner wall via the inner protrusion and the inner retainer portion. This makes the spherical object active so that the spherical object sandwiched between the plate-roll annular portion and the plate-holder annular portion may return to a rollable state even when an adhesion phenomenon occurs in the spherical object. Thus, the rotation support structure allows the smooth rotation of the movable body.

According to at least an embodiment of the present invention, the spherical object, the plate roll, and the plate holder may be made of a metal, and the retainer may be made of a resin. As the retainer is made of a resin, the outer retainer portion and the inner retainer portion, which are disposed on both sides of the spherical-object holding hole, are easy to elastically deform and bend. Therefore, when the relative movement between the plate-roll annular portion and the plate-holder annular portion in the radial direction is transmitted to the outer protrusion from the outer wall, the outer retainer portion is bent and is easily brought into contact with the spherical object. Also, the relative movement between the plate-roll annular portion and the plate-holder annular portion in the radial direction is transmitted to the inner protrusion from the inner wall, the inner retainer portion is bent and is easily brought into contact with the spherical object. Thus, the spherical object may return to a rollable state even when an adhesion phenomenon occurs in the spherical object.

According to at least an embodiment of the present invention, the spherical-object holding holes may be disposed at an equal angular interval. Thus, as the spherical objects may be disposed at an equal angular interval, the rotation support structure easily rotates the movable body in an easy and smooth manner.

According to at least an embodiment of the present invention, the plate-roll annular portion may include a plate-roll annular groove that is coaxial with the optical axis, the plate-holder annular portion may include plate-holder circular arc grooves extending in the circumferential direction around the optical axis, a number of the plate-holder circular arc grooves being identical to a number of the spherical objects, the plate-roll annular groove may be opposed to the plate-holder circular arc groove via the spherical-object holding hole, and a first end portion of each of the spherical objects with respect to the direction of the optical axis may be inserted into the plate-roll annular groove and a second end portion of each of the spherical objects may be inserted into the plate-holder circular arc groove. Thus, it is possible to define the movable range of each of the spherical objects rolling between the plate-roll annular portion and the plate-holder annular portion in the circumferential direction and in the radial direction.

According to at least an embodiment of the present invention, each of the spherical-object holding holes may be an elongated hole that is longer in the circumferential direction than in the radial direction, and when the spherical object is located at a center of the spherical-object holding hole, there may be a gap between the outer retainer portion and the spherical object and between the inner retainer portion and the spherical object. When the spherical-object holding hole is an elongated hole, the outer retainer portion and the inner retainer portion may be elongated in the circumferential direction. Thus, the outer retainer portion and the inner retainer portion are easily bent.

According to at least an embodiment of the present invention, the spherical-object holding hole may be circular or have a contour shape of the inner protrusion and the outer protrusion that is semicircular when viewed in the direction of the optical axis, the retainer may include: an outer projection projecting inward in the radial direction from the outer retainer portion into one of the plurality of spherical-object holding holes and an inner projection projecting outward in the radial direction from the inner retainer portion into one of the plurality of spherical-object holding holes, and the three or more spherical objects may each roll between the outer projection and the inner projection. Therefore, the shape of the outer retainer portion and the shape of the inner retainer portion may be a semi-circular arc shape. As the outer retainer portion and the inner retainer portion may be elongated, the outer retainer portion and the inner retainer portion are easily bent. When the plate-roll annular portion and the plate-holder annular portion shift with respect to the identical axis due to a change in the posture of the rotation support structure, the relative movement between the plate-roll annular portion and the plate-holder annular portion in the radial direction may be transmitted to the spherical object from the outer wall via the outer protrusion, the outer retainer portion, and the outer projection. Furthermore, the relative movement between the plate-roll annular portion and the plate-holder annular portion in the radial direction may be transmitted to the spherical object from the inner wall via the inner protrusion, the inner retainer portion, and the inner projection.

According to at least an embodiment of the present invention, the movable body may include a cylindrical portion that is coaxial with the optical axis and holds the lens on an inner circumference side, the plate-roll annular portion may include the inner wall, the plate-holder annular portion may include the outer wall, and the cylindrical portion may be fitted into an inner circumference side of the inner wall. Thus, the inner wall in contact with the inner protrusion of the retainer may be provided in the plate roll. Furthermore, by the use of the inner wall provided in the plate roll, the plate-roll annular portion may be coaxial with the optical axis.

According to at least an embodiment of the present invention, there may be a gimbal structure to support the rotation support structure rotatably around a first axis intersecting with the optical axis and rotate around a second axis intersecting with the optical axis and the first axis, and a securing body to support the movable body via the gimbal structure and the rotation support structure. The gimbal structure may include a gimbal frame, a first coupling structure to couple the plate holder and the gimbal frame rotatably around the first axis, and a second coupling structure to couple the securing body and the gimbal frame rotatably. The first coupling structure may include a first-axis side shaft secured to the gimbal frame and protruding along the first axis toward the plate holder, and a first-axis side recessed curve provided in the plate holder and rotatably contacting with an end of the first-axis side shaft. The securing body may include a frame surrounding an outer circumference side of the movable body, the rotation support structure, and the gimbal frame. The second coupling structure may include a second-axis side shaft secured to the frame and protruding along the second axis toward the gimbal frame on the second axis, and a second-axis side recessed curve provided in the gimbal frame and rotatably contacting with an end of the second-axis side shaft. Thus, the securing body may support the movable body rotatably around the optical axis, the first axis, and the second axis via the gimbal structure.

According to at least an embodiment of the present invention, when the plate-roll annular portion and the plate-holder annular portion shift with respect to the identical axis due to a change in the posture of the rotation support structure, the relative movement between the plate-roll annular portion and the plate-holder annular portion in the radial direction may be transmitted to the spherical object from the outer wall via the outer protrusion and the outer retainer portion. Furthermore, the relative movement between the plate-roll annular portion and the plate-holder annular portion in the radial direction may be transmitted to the spherical object from the inner wall via the inner protrusion and the inner retainer portion. This makes the spherical object active so that the spherical object sandwiched between the plate-roll annular portion and the plate-holder annular portion may return to a rollable state even when the spherical object has an adhesion state. Thus, the rotation support structure allows the smooth rotation of the movable body.

BRIEF DESCRIPTION OF THE DRAWINGS

Embodiments will now be described, by way of example only, with reference to the accompanying drawings which are meant to be exemplary, not limiting, and where like elements are numbered alike in several Figures, in which.

DETAILED DESCRIPTION

An optical unit with a shake correction function according to at least an embodiment of the present invention is described below with reference to the drawings.

Overall Configuration

Figure 1:
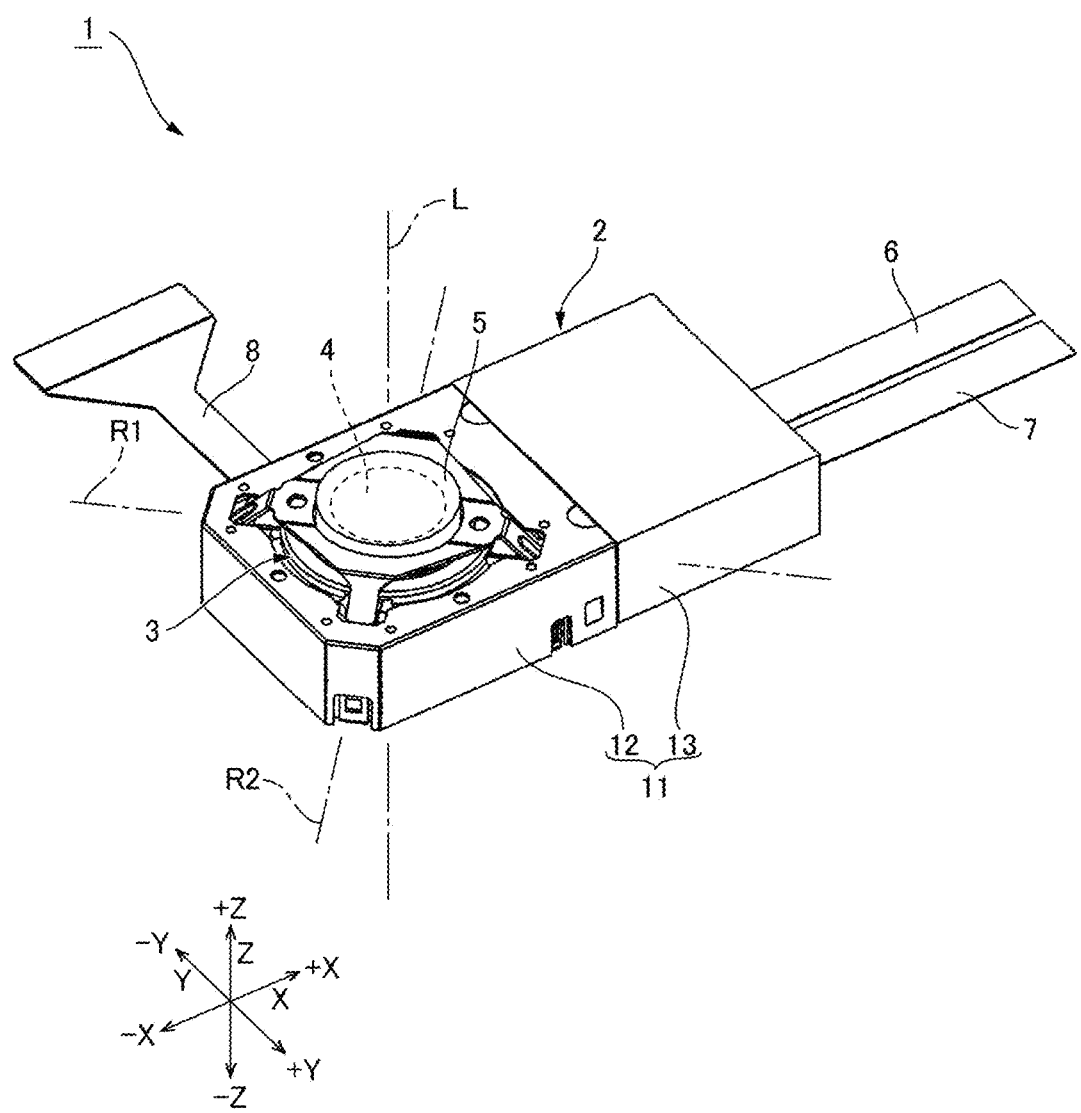
FIG. 1 is a perspective view of an optical unit with a shake correction function.
Figure 2:
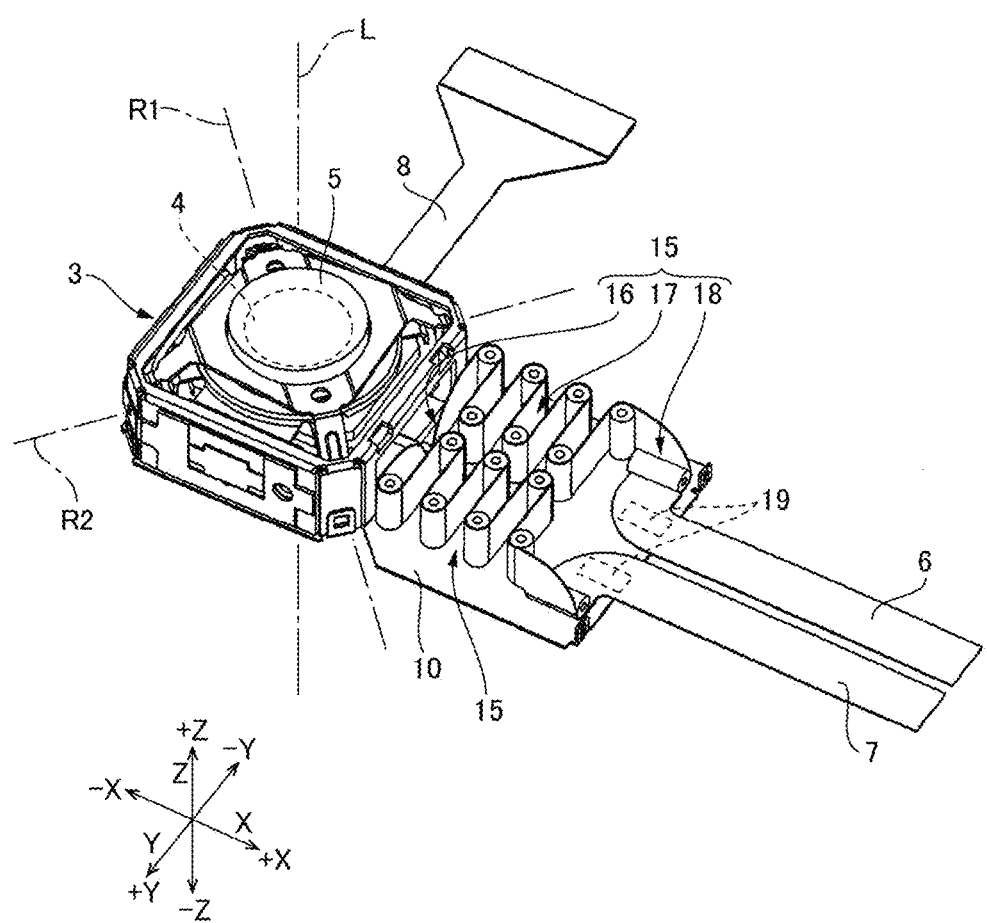
FIG. 2 is a perspective view of the optical unit with a shake correction function from which an object-side cover has been removed.
Figure 3:
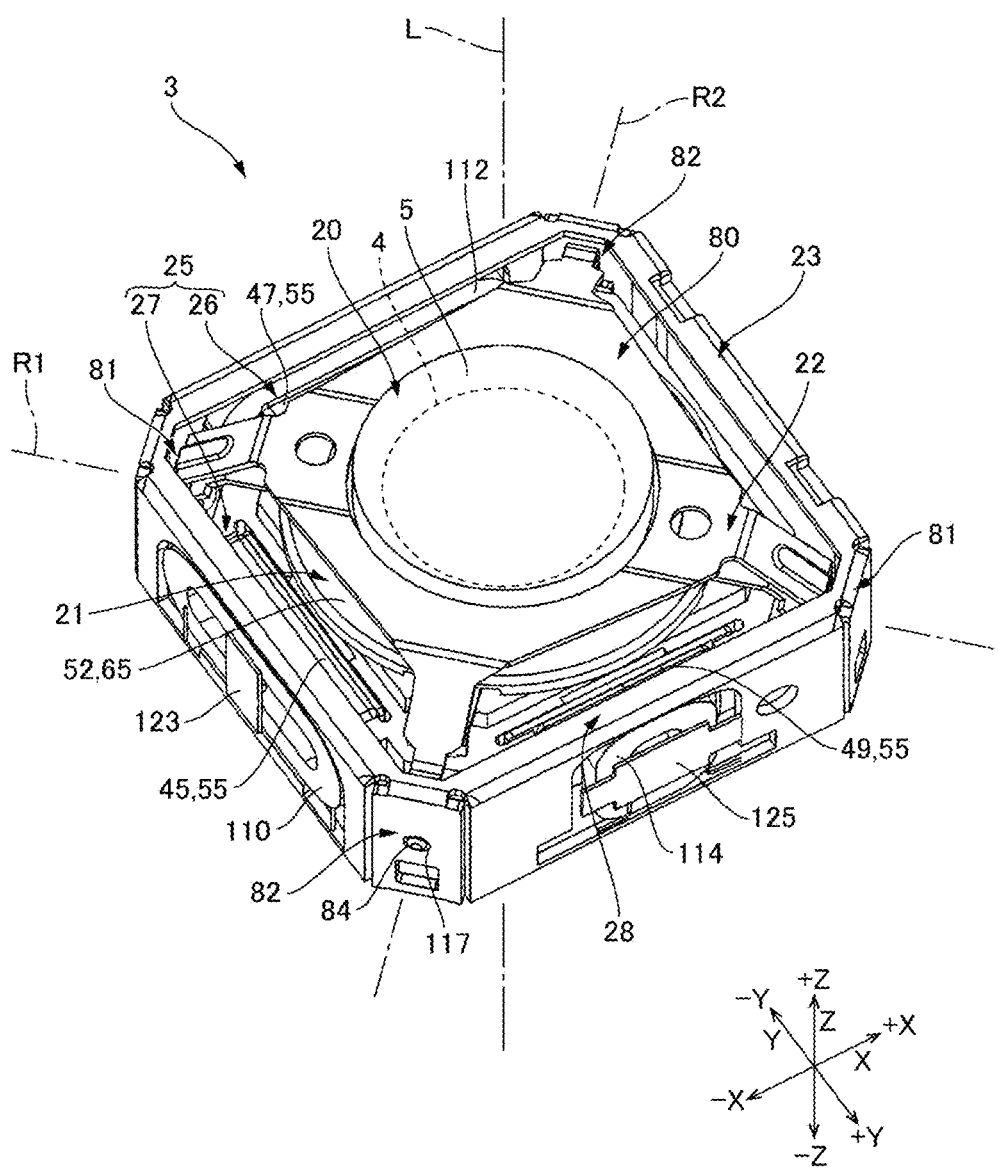
FIG. 3 is a perspective view of an optical-unit main body.
Figure 4:
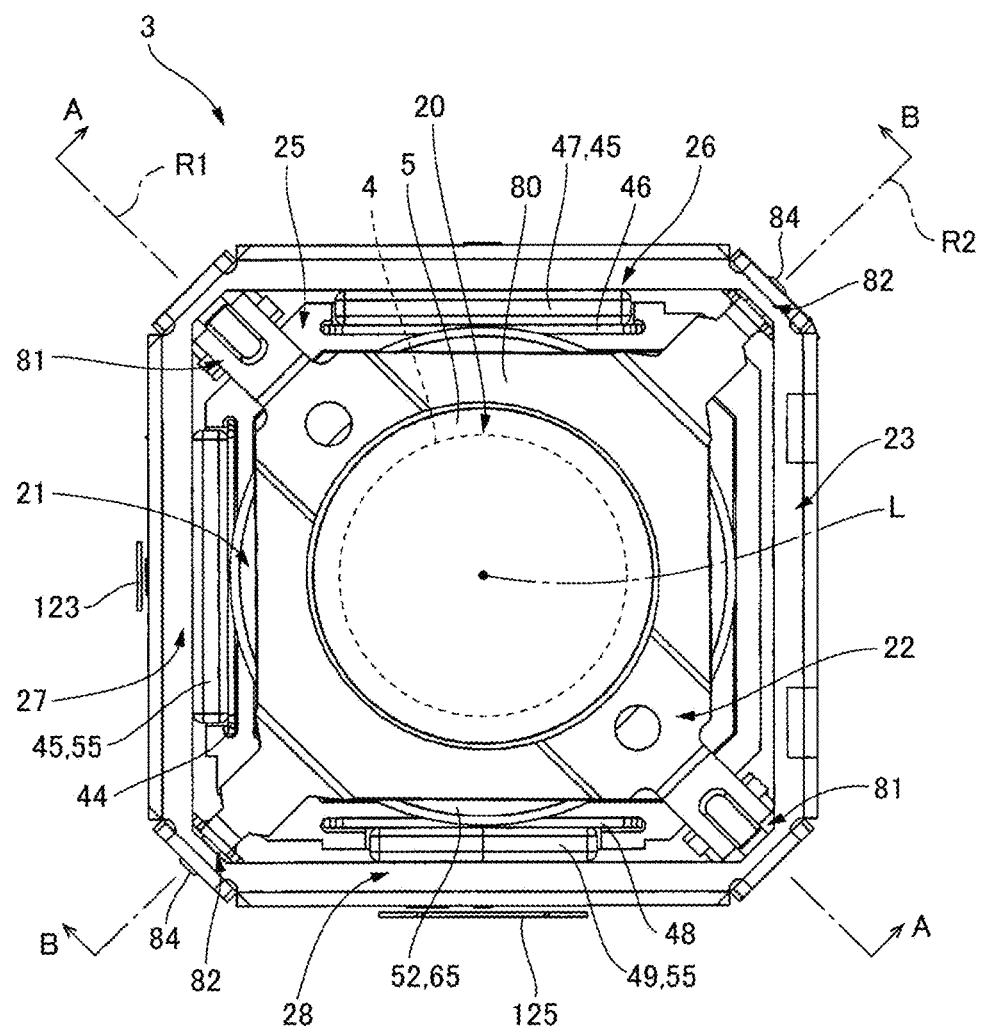
FIG. 4 is a plan view of the optical-unit main body when viewed in an optical axis direction.
Figure 4:
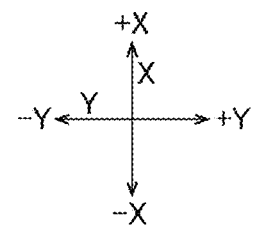
Figure 5:
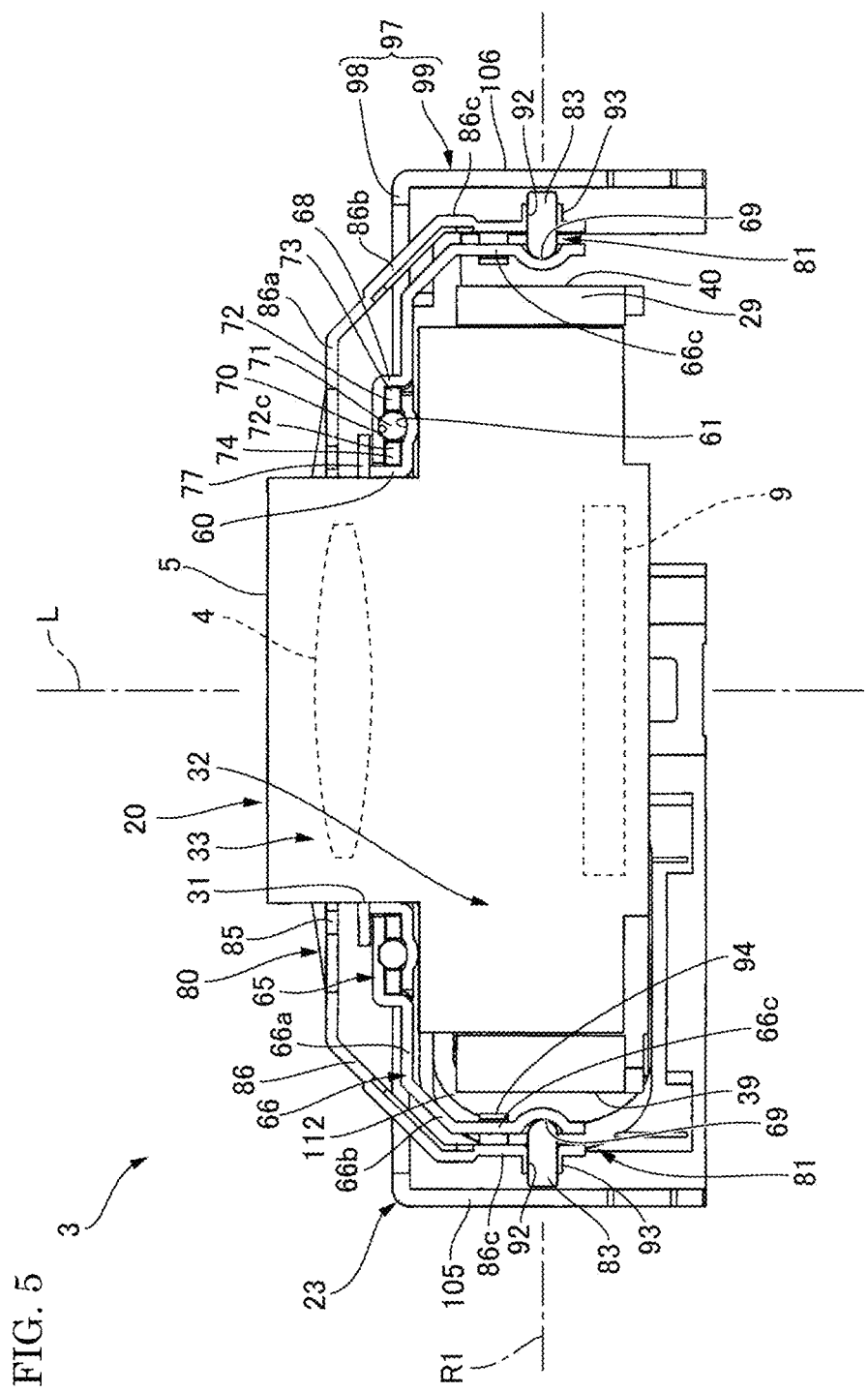
FIG. 5 is a cross-sectional view taken along the line A-A in FIG. 4.
Figure 6:
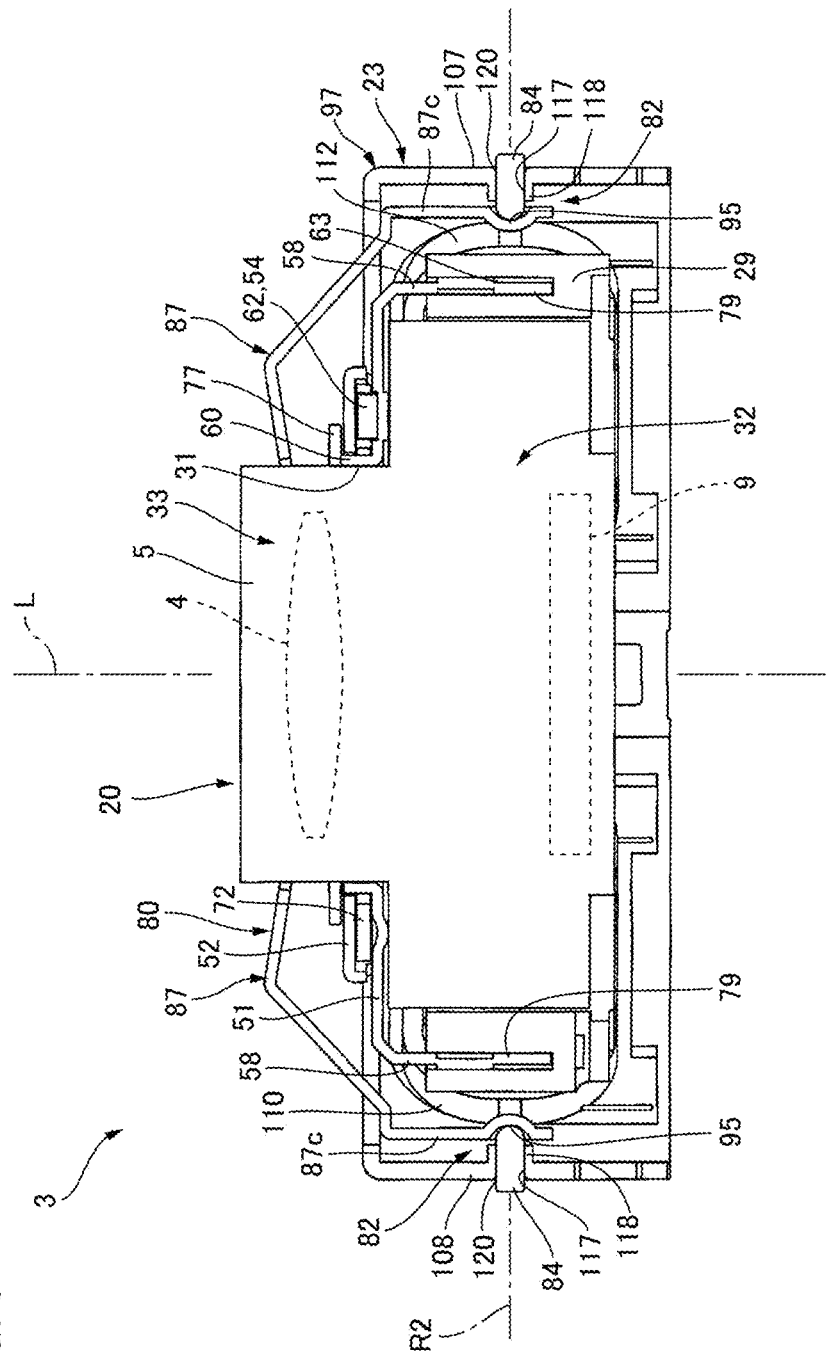
FIG. 6 is a cross-sectional view taken along the line B-B in FIG. 4.
Figure 7:
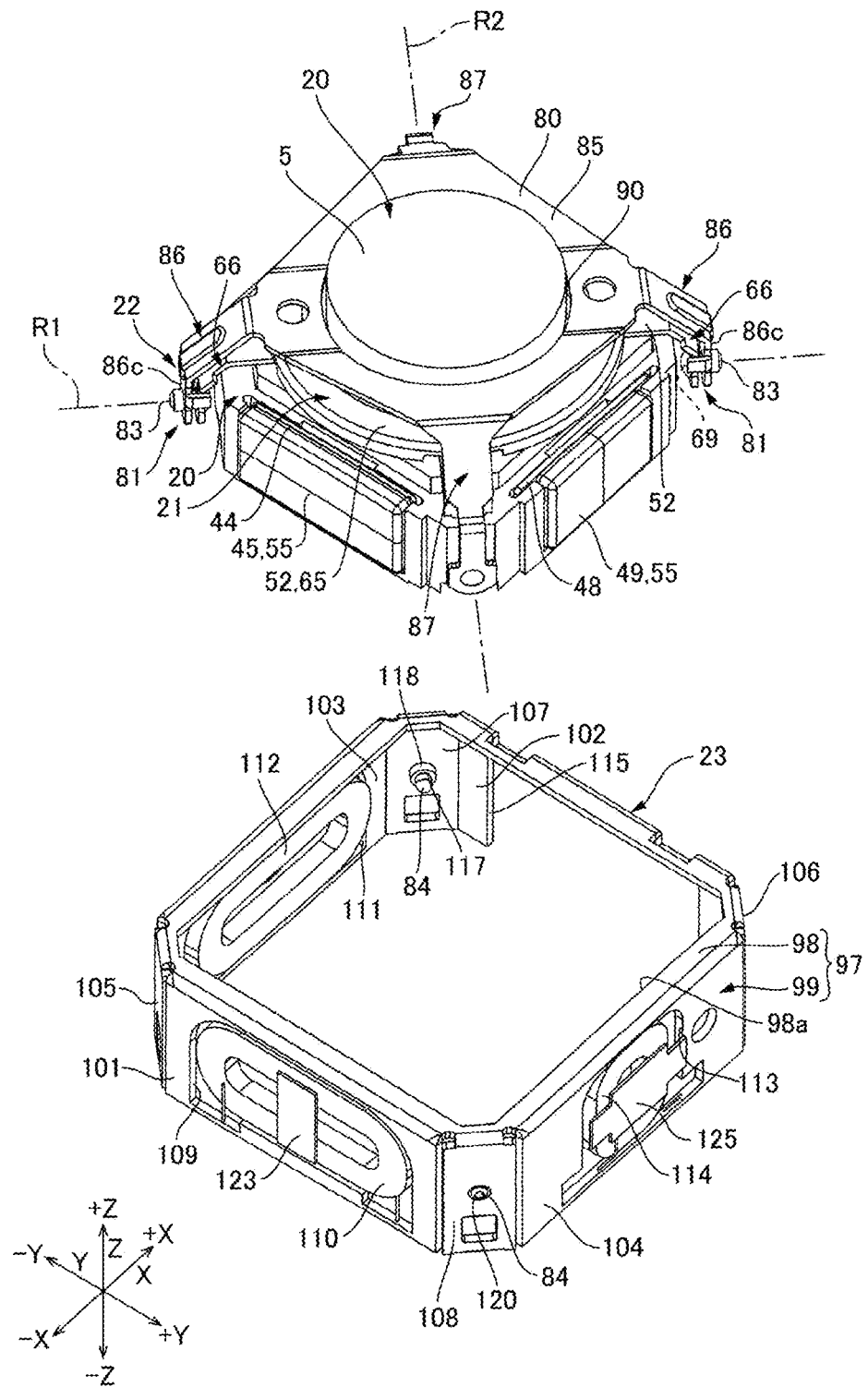
FIG. 7 is an exploded perspective view of the optical-unit main body.

FIG. 1 is a perspective view of an optical unit 1 with a shake correction function. FIG. 2 is a perspective view of the optical unit 1 with a shake correction function from which an object-side cover has been removed. FIG. 3 is a perspective view of an optical-unit main body 3. FIG. 4 is a plan view of the optical-unit main body 3 when viewed in an optical axis direction. A first flexible printed board 6, a second flexible printed board 7, and a third flexible printed board 8 extending from the optical-unit main body 3 are omitted from the illustrations in FIG. 3 and FIG. 4. FIG. 5 is a cross-sectional view taken along the line A-A in FIG. 4. FIG. 6 is a cross-sectional view taken along the line B-B in FIG. 4. FIG. 7 is an exploded perspective view of the optical-unit main body 3.

As illustrated in FIG. 1 and FIG. 2, the optical unit 1 with a shake correction function includes: a cuboid cover 2; and the optical-unit main body 3 housed in the cover 2. The optical-unit main body 3 includes an imaging module 5 including a lens 4 and an imaging element 9 (see FIG. 8). The first flexible printed board 6 and the second flexible printed board 7 extend from the cover 2 in parallel. The third flexible printed board 8 extends from the cover 2 in a direction different from the extending direction of the first flexible printed board 6 and the second flexible printed board 7.

The optical unit 1 with a shake correction function is used in, for example, mobile phones with a camera, optical devices such as dashboard cameras, or optical devices such as action cameras or wearable cameras installed in a moving body such as helmet, bicycle, or radio-controlled helicopter. With such an optical device, if the shake of the optical device occurs during imaging, the captured image is disturbed. To prevent the inclination of a captured image, the optical unit 1 with a shake correction function corrects the inclination of the imaging module 5 based on the acceleration, the angular velocity, the degree of shake, etc., detected by a detecting unit such as a gyroscope.

The optical unit 1 with a shake correction function according to this example rotates the imaging module 5 around an optical axis L of the lens 4, around a first axis R1 perpendicular to the optical axis L, and around a second axis R2 perpendicular to the optical axis L and the first axis R1 so as to correct the shake.

In the following description, the three axes perpendicular to one another are the X-axis direction, the Y-axis direction, and the Z-axis direction. One side of the X-axis direction is the −X direction and the other side thereof is the +X direction. One side of the Y-axis direction is the −Y direction, and the other side thereof is the +Y direction. One side of the Z-axis direction is the −Z direction, and the other side thereof is the +Z direction. The X-axis direction is the longitudinal direction of the cover 2. The Y-axis direction is the lateral direction of the cover 2. The first flexible printed board 6 and the second flexible printed board 7 extend from the cover 2 in the +X direction. The third flexible printed board 8 extends from the cover 2 in the −Y direction. The Z-axis direction is the optical axis direction along the optical axis L. The −Z direction is the image side of the imaging module 5, and the +Z direction is the object side of the imaging module 5. The first axis R1 and the second axis R2 are tilted around the Z-axis (around the optical axis L) by 45 degrees with respect to the X-axis and the Y-axis.

As illustrated in FIG. 2, the cover 2 includes a plate-shaped image-side cover 10 that covers the optical-unit main body 3 from the −Z direction. As illustrated in FIG. 1, the cover 2 includes an object-side cover 11 that is placed over the image-side cover 10 from the +Z direction. The object-side cover 11 includes: a first cover 12 having a frame-like shape and covering the outer circumference of the optical-unit main body 3; and a second cover 13 having a box-like shape and disposed in the +X direction of the first cover 12. The second cover 13 partially covers the first flexible printed board 6 and the second flexible printed board 7 that extend from the optical-unit main body 3 in the +X direction.

As illustrated in FIG. 2, each of the first flexible printed board 6 and the second flexible printed board 7 includes a bend portion 15 that is a portion covered with the second cover 13. The bend portion 15 includes: a first bend portion 16 that extends along the XY plane and bends in the Z-axis direction; a second bend portion 17 that bends in the X-axis direction along the YZ plane; and a third bend portion 18 that bends in the Y-axis direction along the XZ plane. The second bend portions 17 are disposed in the X-axis direction to form a winding arrangement. The end of the bend portion 15 of the flexible printed board in the +X direction is secured to the end of the image-side cover 10 in the +X direction via a reinforcing plate 19.

As illustrated in FIG. 3, FIG. 4, and FIG. 7, the optical-unit main body 3 includes: a movable body 20 including the imaging module 5; and a rotation support structure 21 rotatably supporting the movable body 20 around the optical axis L. The optical-unit main body 3 further includes: a gimbal structure 22 that supports the rotation support structure 21 rotatably the rotation support structure 21 around the first axis R1 and around the second axis R2; and a securing body 23 that supports the movable body 20 via the gimbal structure 22 and the rotation support structure 21. The movable body 20 is supported by the securing body 23 via the rotation support structure 21 and the gimbal structure 22 rotatably around the first axis R1 and the second axis R2. The movable body 20 rotates around the first axis R1 and the second axis R2 in combination to rotate around the X-axis and the Y-axis. Accordingly, the optical unit 1 with a shake correction function performs a pitching correction around the X-axis, a yawing correction around the Y-axis, and a rolling correction around the Z-axis.

The optical-unit main body 3 includes a shake-correction magnetic drive structure 25 that rotates the movable body 20 around the first axis R1 and the second axis R2. The shake-correction magnetic drive structure 25 includes: a first shake-correction magnetic drive structure 26 that generates a drive force around the X-axis for the movable body 20; and a second shake-correction magnetic drive structure 27 that generates a drive force around the Y-axis for the movable body 20. The first shake-correction magnetic drive structure 26 is disposed in the −Y direction from the imaging module 5. The second shake-correction magnetic drive structure 27 is disposed in the −X direction of the imaging module 5. The optical-unit main body 3 further includes a rolling-correction magnetic drive structure 28 that rotates the movable body 20 around the optical axis L. The rolling-correction magnetic drive structure 28 is disposed in the +Y direction from the imaging module 5.

The first shake-correction magnetic drive structure 26, the second shake-correction magnetic drive structure 27, and the rolling-correction magnetic drive structure 28 are arranged in the circumferential direction around the optical axis L. When viewed in the direction perpendicular to the optical axis L, the rolling-correction magnetic drive structure 28 is overlapped with the shake-correction magnetic drive structure 25. According to this example, the rolling-correction magnetic drive structure 28 and the first shake-correction magnetic drive structure 26 are disposed at the opposing positions with the optical axis L interposed therebetween.

As illustrated in FIG. 2, the third flexible printed board 8 extends along the outer circumference of the optical-unit main body 3. The third flexible printed board 8 extends from the outer circumference of the optical-unit main body 3 in the −Y direction.

Movable Body

Figure 8:
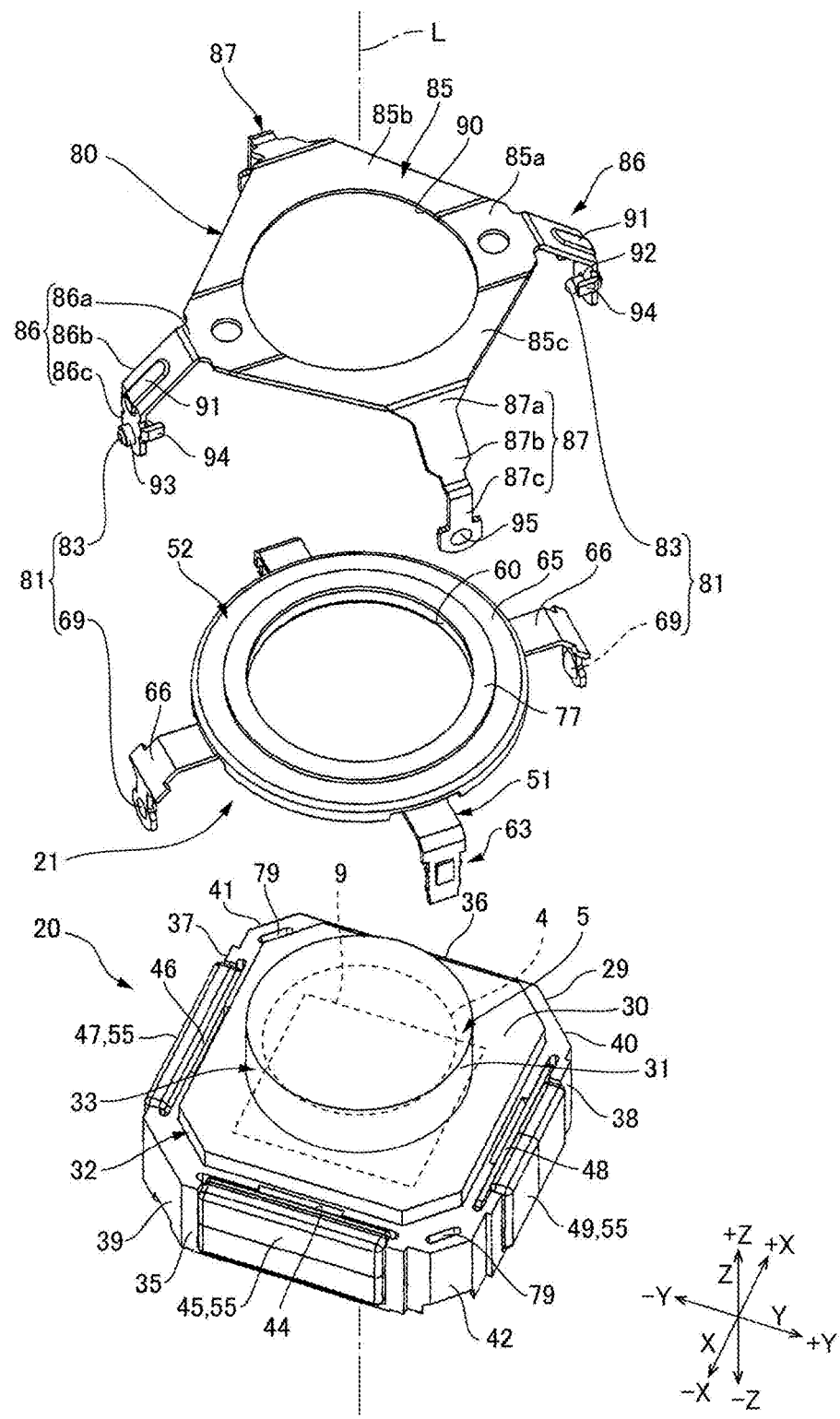
FIG. 8 is an explanatory diagram of a movable body, a rotation support structure, and a gimbal structure.

FIG. 8 is an explanatory diagram of the movable body 20, the rotation support structure 21, and the gimbal structure 22. As illustrated in FIG. 8, the movable body 20 includes: the imaging module 5; and a holder 29 having a frame-like shape and surrounding the outer circumference side of the imaging module 5. The imaging module 5 includes: an imaging-module main body 30; and a cylindrical portion 31 protruding from the center of the imaging-module main body 30 in the +Z direction. The cylindrical portion 31 houses the lens 4. The cylindrical portion 31 is coaxial with the optical axis L and extends in the direction of the optical axis L with a certain outer diameter. The imaging-module main body 30 houses the imaging element 9. The imaging element 9 is disposed in the −Z direction of the lens 4 on the optical axis L of the lens 4. The holder 29 and the imaging-module main body 30, which is located inside the holder 29 of the imaging module 5 in the radial direction of the holder 29, constitute a movable-body main body 32. The cylindrical portion 31 of the imaging module 5 forms a movable-body protrusion 33 protruding from the center of the movable-body main body 32 in the +Z direction.

As illustrated in FIG. 8, the movable-body main body 32 has substantially an octagon shape when viewed from above. The movable-body main body 32 includes: a first side wall 35 and a second side wall 36 extending parallel to the Y-direction; and a third side wall 37 and a fourth side wall 38 extending parallel to the X-direction. The first side wall 35 is disposed in the −X direction from the second side wall 36. The third side wall 37 is disposed in the −Y direction from the fourth side wall 38. The movable-body main body 32 further includes a fifth side wall 39 and a sixth side wall 40 that are diagonally placed with respect to the direction of the first axis R1; and a seventh side wall 41 and an eighth side wall 42 that are diagonally placed with respect to the direction of the second axis R2. The fifth side wall 39 is disposed in the −X direction from the sixth side wall 40. The seventh side wall 41 is disposed in the −Y direction from the eighth side wall 42.

The first side wall 35 of the movable body 20 is secured to a first magnet 45 (shake-correction magnet) via a plate-shaped first yoke 44 that is made of a magnetic material. The first magnet 45 is divided into two in the Z-axis direction. The third side wall 37 of the movable body 20 is secured to a second magnet 47 (shake-correction magnet) via a plate-shaped second yoke 46 that is made of a magnetic material. The first magnet 45 and the second magnet 47 are arranged such that the same pole is assigned in the Z-axis direction. The second magnet 47 is divided into two in the Z-axis direction. The fourth side wall 38 of the movable body 20 is secured to a third magnet 49 (rolling-correction magnet) via a plate-shaped third yoke 48 that is made of a magnetic material. The third magnet 49 is divided into two in the circumferential direction.

The first magnet 45 and the second magnet 47 are shake-correction magnets for the shake-correction magnetic drive structure 25 that rotates the movable body 20 around the first axis R1 and the second axis R2. The shake-correction magnetic drive structure 25 includes, as shake-correction magnets, the first magnet 45 and the second magnet 47 disposed in the circumferential direction with the first axis R1 interposed therebetween. The third magnet 49 is a rolling-correction magnet for the rolling-correction magnetic drive structure 28 that rotates the movable body 20 around the optical axis L. The third magnet 49 is disposed on the side opposite to the second magnet 47 with the optical axis L interposed therebetween.

Rotation Support Structure

Figure 9:
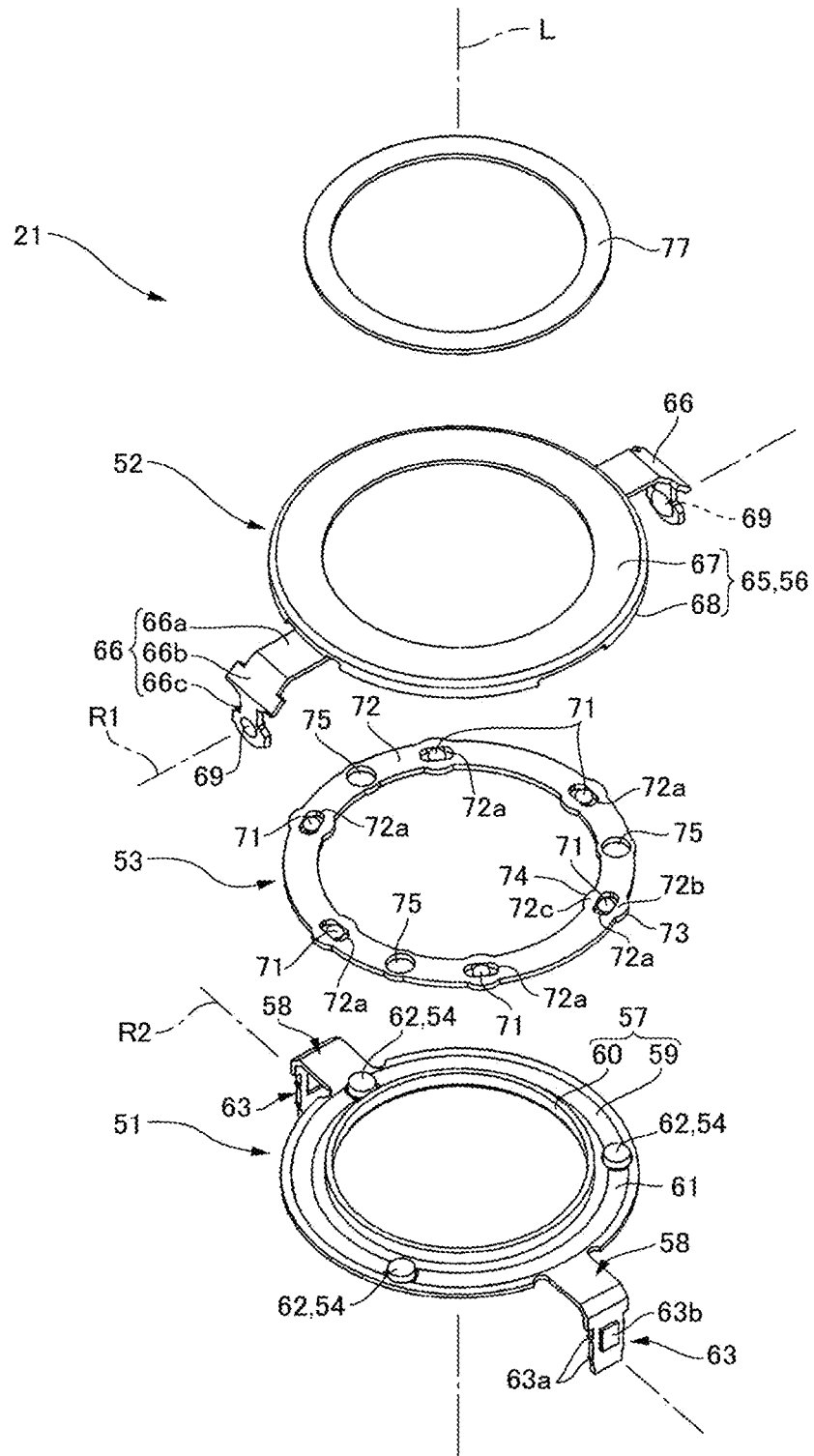
FIG. 9 is an exploded perspective view of the rotation support structure when viewed from one side in the optical axis direction.
Figure 10:
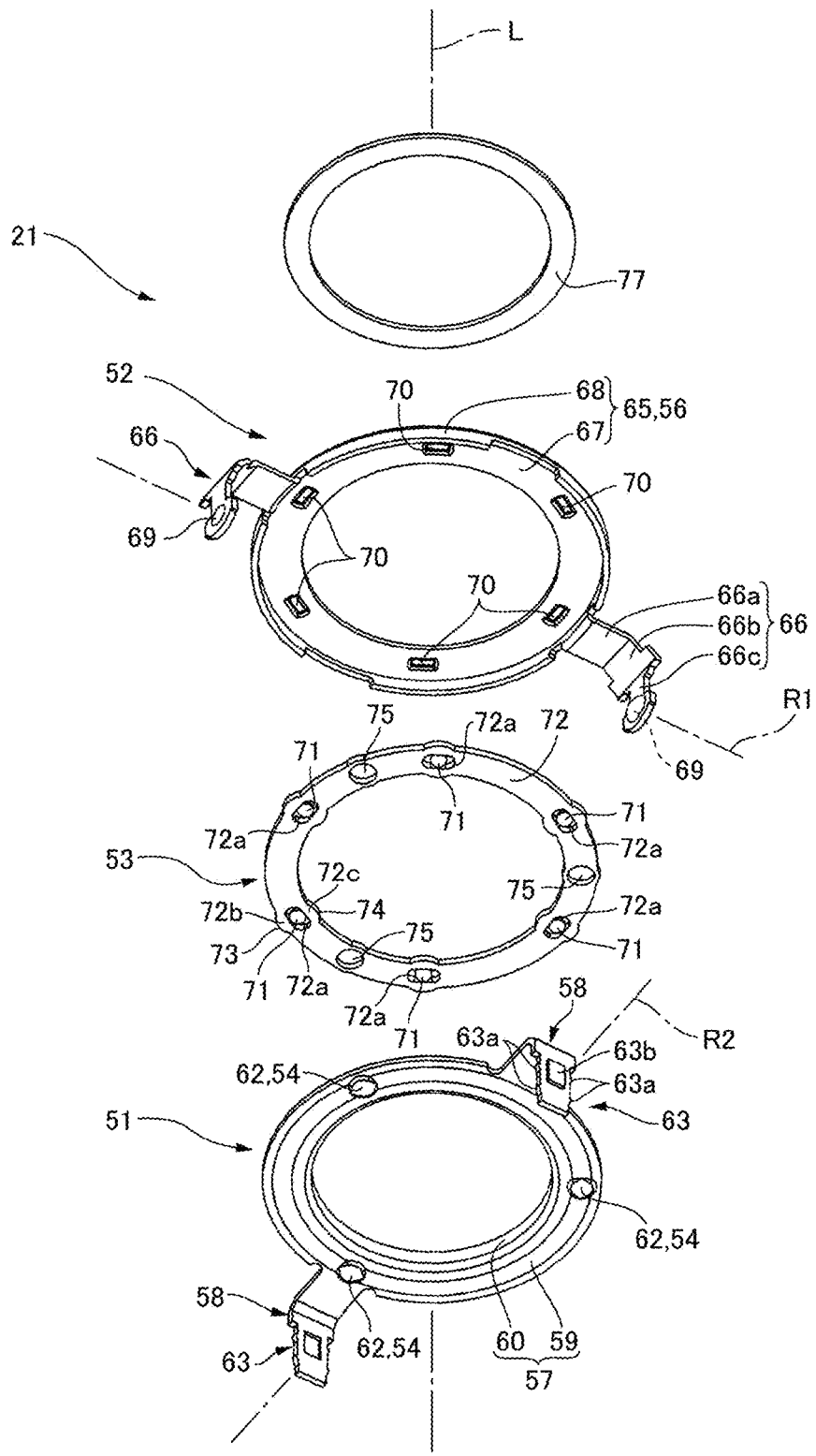
FIG. 10 is an exploded perspective view of the rotation support structure when viewed from the other side in the optical axis direction.

FIG. 9 is an exploded perspective view of the rotation support structure 21 when viewed in the +Z direction. FIG. 10 is an exploded perspective view of the rotation support structure 21 when viewed in the −Z direction. As illustrated in FIG. 9 and FIG. 10, the rotation support structure 21 includes: a plate roll 51 secured to the movable body 20; a plate holder 52 including a facing portion 56 facing the plate roll 51 in the Z-axis direction; and a rotation structure 53 allowing the rotation of the plate roll 51 and the plate holder 52 around the optical axis L. The rotation support structure 21 further includes a first pressurization structure 54 and a second pressurization structure 55 to bias the plate roll 51 in the direction so as to come close to the plate holder 52.

The plate roll 51 is made of a metal and a non-magnetic material. The plate roll 51 includes: a plate-roll annular portion 57 surrounding the optical axis L; and a pair of plate-roll extension portions 58 protruding from the plate-roll annular portion 57 to both sides in the direction of the second axis R2 and extending in the −Z direction. The plate-roll annular portion 57 includes: a plate-roll annular plate 59; and a plate-roll annular wall 60 (inner wall) bending and extending from the inner circumference edge of the plate-roll annular plate 59 in the +Z direction. The plate-roll annular wall 60 has a tubular shape. As illustrated in FIG. 9, the end surface of the plate-roll annular plate 59 with respect to the +Z direction includes a plate-roll annular groove 61 at the center in the radial direction. Pressurization magnets 62 are secured to the plate-roll annular plate 59 at three positions in the circumferential direction at an equal angular interval.

Each of the plate-roll extension portions 58 in the pair includes a secured portion 63 provided in the end portion in the −Z direction and secured to the movable body 20. The secured portion 63 includes a plurality of wedge-shaped protrusions 63a provided in both edges in the circumferential direction and having a wider width in the circumferential direction toward the +Z direction. The outer surface of the secured portion 63 with respect to the direction of the second axis R2 includes a rectangular protrusion 63b. The rectangular protrusion 63b protrudes by a larger degree in the direction of the second axis R2 toward the +Z direction.

The plate holder 52 is made of a magnetic material. The plate holder 52 includes a plate-holder annular portion 65; and a pair of plate-holder extension portions 66 protruding from the plate-holder annular portion 65 to both sides in the direction of the first axis R1 and extending in the −Z direction. The plate-holder annular portion 65 is, in the plate holder 52, a facing portion 56 facing the plate-roll annular portion 57 in the Z-axis direction.

The plate-holder annular portion 65 includes: a plate-holder annular plate 67 disposed on the side of the plate-roll annular portion 57 in the +Z direction; and a plurality of plate-holder circular arc walls 68 (outer walls) bending in the −Z direction from the outer circumference edge of the plate-holder annular plate 67. As illustrated in FIG. 10, plate-holder circular arc grooves 70 extending in the circumferential direction are provided on the end surface of the plate-holder annular plate 67 with respect to the −Z direction. According to this example, the six plate-holder circular arc grooves 70 are provided at an equal angular interval. Each of the plate-holder circular arc grooves 70 is opposed to the plate-roll annular groove 61 in the Z-axis direction.

Each of the plate-holder extension portions 66 in the pair includes: plate-holder first extension portions 66a extending from the plate-holder annular portion 65 to both sides in the direction of the first axis R1; a plate-holder second extension portion 66b extending from the outer circumference end of the plate-holder first extension portion 66a and inclining in the −Z direction and in a direction away from the plate-holder annular portion 65; and a plate-holder third extension portion 66c extending in the −Z direction from the edge of the plate-holder second extension portion 66b in the −Z direction on the outer circumference side of the movable body 20. As illustrated in FIG. 5, the plate-holder first extension portions 66a protrude in the direction of the first axis R1 from the edges of the plate-holder circular arc walls 68 in the −Z direction disposed at both sides in the direction of the first axis R1. The plate-holder third extension portion 66c in one of the plate-holder extension portions 66 is opposed to the fifth side wall 39 of the movable body 20 with a small gap in the direction of the first axis R1. The plate-holder third extension portion 66c in the other of the plate-holder extension portions 66 is opposed to the sixth side wall 40 of the movable body 20 with a small gap in the direction of the first axis R1. Each of the plate-holder third extension portions 66c includes a first-axis side recessed curve 69 that is recessed inward (toward the movable body 20) in the radial direction on the line of the first axis R1.

As illustrated in FIG. 9 and FIG. 10, the rotation structure 53 includes a plurality of spherical objects 71 and a retainer 72. The spherical object 71 is made of a metal. The retainer 72 is made of a resin. The retainer 72 includes a plurality of spherical-object holding holes 72a holding the respective spherical objects 71 in a rollable manner. According to this example, the rotation structure 53 includes the six spherical objects 71. Therefore, the retainer 72 includes the six spherical-object holding holes 72a. The spherical object 71 is held by the spherical-object holding hole 72a to protrude from the retainer 72 in the −Z direction and in the +Z direction. According to this example, each of the spherical-object holding holes 72a is an elongated hole that is longer in the circumferential direction than in the radial direction. When the spherical object 71 is located at the center of the spherical-object holding hole 72a, there is a gap between the spherical object 71 and an outer retainer portion 72b of the retainer 72 on the outer circumference side of the spherical-object holding hole 72a and between the spherical object 71 and an inner retainer portion 72c of the retainer 72 on the inner circumference side of the spherical-object holding hole 72a.

The retainer 72 includes: an outer protrusion 73 protruding to the outer circumference side from the outer retainer portion 72b, which is located outside of each of the spherical-object holding holes 72a in the radial direction; and an inner protrusion 74 protruding to the inner circumference side from the inner retainer portion 72c, which is located inside of each of the spherical-object holding holes 72a in the radial direction. The retainer 72 includes retainer through-holes 75 perforating in the Z-axis direction at three positions in the circumferential direction.

As illustrated in FIG. 8, the plate-roll annular wall 60 is inserted into the inside of the plate-holder annular portion 65 in the −Z direction so that the plate roll 51 and the plate holder 52 are overlapped with each other in the Z-axis direction. The end portion in the +Z direction of the plate-roll annular wall 60 protrudes in the +Z direction as compared with the plate-holder annular portion 65. When the plate roll 51 and the plate holder 52 are overlapped with each other, the spherical objects 71 and the retainer 72 are disposed between the plate-holder annular portion 65 and the plate-roll annular portion 57.

When the retainer 72 is disposed between the plate-holder annular portion 65 and the plate-roll annular portion 57, the plate-holder circular arc wall 68 is in contact with the outer protrusion 73 from outside in the radial direction, as illustrated in FIG. 5. Further, the plate-roll annular wall 60 is in contact with the inner protrusion 74 from inside in the radial direction. Thus, the retainer 72 is positioned in the radial direction between the plate-holder annular portion 65 and the plate-roll annular portion 57. The end portion in the −Z direction of each of the spherical objects 71 housed in the respective spherical-object holding holes 72a of the retainer 72 is inserted into the plate-roll annular groove 61, and end portion thereof in the +Z direction is inserted into the plate-holder circular arc groove 70. When the retainer 72 is disposed between the plate-holder annular portion 65 and the plate-roll annular portion 57, the pressurization magnet 62 is inserted into the retainer through-hole 75.

As illustrated in FIG. 5 and FIG. 8, the edge of the plate-roll annular wall 60 in the +Z direction is secured to an annular plate member 77. When viewed in the direction of the optical axis L, the outer circumference portion of the plate member 77 is overlapped with the inner circumference edge portion of the plate-holder annular portion 65. A small gap is formed in the Z-axis direction between the plate member 77 and the plate-holder annular portion 65. The pressurization magnet 62, secured to the plate-roll annular portion 57 and inserted into the retainer through-hole 75, attracts the plate roll 51, which is made of a non-magnetic material, in the direction so as to come close to the plate holder 52. That is, the pressurization magnets 62 constitute the first pressurization structure 54 that biases the plate roll 51 in the direction so as to come close to the plate holder 52.

As illustrated in FIG. 6 and FIG. 8, the movable body 20 includes plate-roll securing holes 79 at the two edge portions of the movable-body main body 32 with respect to the direction of the second axis R2 to receive the secured portions 63 of the plate-roll extension portions 58 in the pair. The plate-roll securing hole 79 is provided in the holder 29. The plate-roll securing holes 79 extend in the −Z direction in parallel to the seventh side wall 41 and the eighth side wall 42.

The secured portion 63 of each of the plate-roll extension portions 58 of the plate roll 51 is pressed into the plate-roll securing hole 79 so that the rotation support structure 21 is secured to the movable body 20. When the secured portion 63 is inserted into the plate-roll securing hole 79, the movable-body protrusion 33 is inserted into the plate-roll annular wall 60. Accordingly, the movable-body protrusion 33 (the cylindrical portion 31) is fitted into the plate-roll annular wall 60 so that the plate roll 51 is secured to the movable body 20 in a state where the plate-roll annular wall 60 is positioned so as to be coaxial with the optical axis L. When the secured portion 63 of each of the plate-roll extension portions 58 is pressed into the plate-roll securing hole 79, the protrusion 63a and the protrusion 63b of the secured portion 63 are plastically deformed and crushed. Thus, the plate roll 51 and the movable body 20 are secured to each other. When the plate roll 51 and the movable body 20 are secured, the movable body 20 is rotatable around the optical axis L together with the plate roll 51.

When the plate roll 51 of the rotation support structure 21 and the movable body 20 are secured to each other, the plate holder 52, which is made of a magnetic material, is located on the side opposite to the first magnet 45, the second magnet 47, and the third magnet 49 with respect to the plate roll 51. In other words, the plate-holder annular portion 65 is located on the side opposite to the first magnet 45, the second magnet 47, and the third magnet 49 with the plate-roll annular portion 57 interposed therebetween in the Z-axis direction. Accordingly, the first magnet 45, the second magnet 47, and the third magnet 49 attract the plate-holder annular portion 65 in the direction so as to come close to the plate-roll annular portion 57. Thus, the first magnet 45, the second magnet 47, and the third magnet 49 constitute the second pressurization structure 55 that biases the plate roll 51 in the direction so as to come close to the plate holder 52. According to this example, the movable body 20 and the plate roll 51 are attracted toward the plate-holder annular portion 65 in the +Z direction due to the attractive forces of the first magnet 45, the second magnet 47, and the third magnet 49 attracting the plate-holder annular portion 65 in the direction to come close to the plate-roll annular portion 57.

Gimbal Structure

Figure 11:
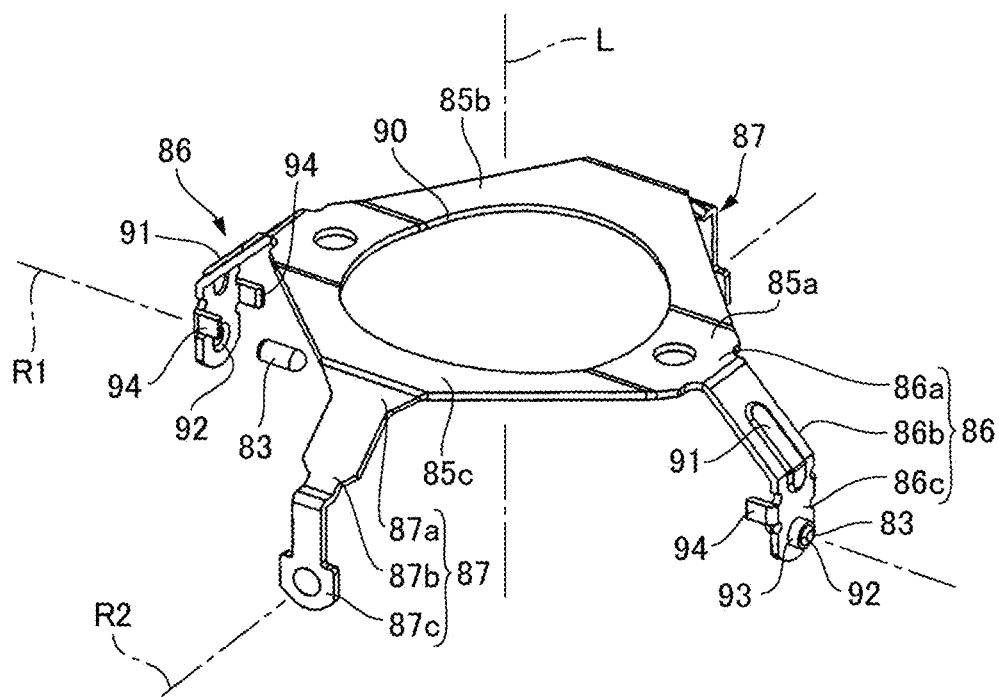
FIG. 11 is an exploded perspective view of a gimbal frame and a first-axis side shaft.

FIG. 11 is an exploded perspective view of a gimbal frame 80 and a first-axis side shaft 83. As illustrated in FIG. 4, the gimbal structure 22 includes: the gimbal frame 80; and a first coupling structure 81 coupling the gimbal frame 80 and the plate holder 52 rotatably around the first axis R1. The gimbal structure 22 further includes a second coupling structure 82 coupling the gimbal frame 80 and the securing body 23 rotatably around the second axis R2. As illustrated in FIG. 5 and FIG. 7, the first coupling structure 81 includes: the first-axis side shaft 83 protruding along the first axis R1 toward the plate holder 52 from the gimbal frame 80; and the first-axis side recessed curve 69 provided in the plate holder 52 and rotatably contacting with the end of the first-axis side shaft 83. As illustrated in FIG. 6 and FIG. 7, the second coupling structure 82 includes: a second-axis side shaft 84 protruding along the second axis R2 toward the gimbal frame 80 from the securing body 23; and a second-axis side recessed curved face 95 provided in the gimbal frame 80 and contacting with the end of the second-axis side shaft 84.

Gimbal Frame

The gimbal frame 80 is a metallic plate spring. As illustrated in FIG. 8, the gimbal frame 80 includes: a gimbal-frame main body 85 disposed in the +Z direction from the plate holder 52; a pair of first-axis side gimbal frame extension portions 86 protruding from the gimbal-frame main body 85 toward both sides in the direction of the first axis R1 and extending in the −Z direction; and a pair of second-axis side gimbal frame extension portions 87 protruding from the gimbal-frame main body 85 to both sides in the direction of the second axis R2 and extending in the −Z direction. The gimbal-frame main body 85 includes: a center plate portion 85a having substantially a rectangular shape and extending in the direction of the first axis R1; a first inclined plate portion 85b extending from one side (the side in the −Y direction) of the center plate portion 85a with respect to the direction of the second axis R2 toward the outer circumference side and inclining in the +Z direction; and a second inclined plate portion 85c extending from the other side (the side in the +Y direction) of the center plate portion 85a with respect to the direction of the second axis R2 toward the outer circumference side and inclining in the +Z direction. The gimbal-frame main body 85 includes an opening 90 provided at the center and perforating in the Z-axis direction. The movable-body protrusion 33 is inserted into the opening 90.

As illustrated in FIG. 5, FIG. 7, and FIG. 8, the pair of first-axis side gimbal frame extension portions 86 is located on the outer circumference side of the plate holder 52. As illustrated in FIG. 8, each of the first-axis side gimbal frame extension portions 86 in the pair includes: a first-axis side gimbal frame extension portion first extension portion 86a extending in a direction away from the gimbal-frame main body 85 along the direction of the first axis R1; a first-axis side gimbal frame extension portion second extension portion 86b (inclined extension portion) extending from the end of the first-axis side gimbal frame extension portion first extension portion 86a in a direction away from the gimbal-frame main body 85 along the direction of the first axis R1 and inclining in the −Z direction; and a first-axis side gimbal frame extension portion third extension portion 86c (coupling extension portion) extending in the −Z direction from the end of the first-axis side gimbal frame extension portion second extension portion 86b in the −Z direction on the outer circumference side of the plate holder 52.

As illustrated in FIG. 5 and FIG. 8, the first-axis side gimbal frame extension portion first extension portion 86a protrudes from the center plate portion 85a in the direction of the first axis R1. The first-axis side gimbal frame extension portion third extension portion 86c includes a gimbal-frame extension portion through-hole 92 perforating in the direction of the first axis R1. The first-axis side gimbal frame extension portion third extension portion 86c includes a first-axis side shaft support cylindrical portion 93 protruding from the hole edge of the gimbal-frame extension portion through-hole 92 to the outer circumference side in the direction of the first axis R1. The first-axis side gimbal frame extension portion third extension portion 86c includes a pair of gimbal-frame extension portion protrusions 94 protruding to the inner circumference side from both edges in the circumferential direction. In the first-axis side gimbal frame extension portion third extension portion 86c, the pair of gimbal-frame extension portion protrusions 94 is located in the +Z direction of the gimbal-frame extension portion through-hole 92. A rib 91 is provided on the outer surface of the first-axis side gimbal frame extension portion 86 on the side opposite to the plate-holder extension portion 66 and extending from the first-axis side gimbal frame extension portion second extension portion 86b to the first-axis side gimbal frame extension portion third extension portion 86c. The rib 91 extends through a bend portion between the first-axis side gimbal frame extension portion second extension portion 86b and the first-axis side gimbal frame extension portion third extension portion 86c.

The first-axis side shaft 83 has a cylindrical shape and is inserted into the gimbal-frame extension portion through-hole 92 and the first-axis side shaft support cylindrical portion 93 to be held by the gimbal frame 80. Thus, the first-axis side shaft 83 extends on the first axis R1 in the direction of the first axis R1. The end of the first-axis side shaft 83 on the inner circumference side protrudes from the first-axis side gimbal frame extension portion third extension portion 86c toward the plate-holder extension portion 66. The end of the first-axis side shaft 83 on the inner circumference side has a hemispherical surface.

Next, as illustrated in FIG. 8, each of the second-axis side gimbal frame extension portions 87 in the pair includes: a second-axis side gimbal frame extension portion first extension portion 87a extending in a direction away from the gimbal-frame main body 85 along the direction of the second axis R2; a second-axis side gimbal frame extension portion second extension portion 87b extending from the end of the second-axis side gimbal frame extension portion first extension portion 87a in a direction away from the gimbal-frame main body 85 along the direction of the second axis R2 and inclining in the −Z direction; and a second-axis side gimbal frame extension portion third extension portion 87c extending from the end of the second-axis side gimbal frame extension portion second extension portion 87 in the −Z direction b in the −Z direction on the outer circumference side of the movable body 20. The second-axis side gimbal frame extension portion first extension portion 87a in one of the second-axis side gimbal frame extension portions 87 in the −Y direction protrudes from the edge of the first inclined plate portion 85b on the outer circumference side in the direction of the second axis R2. The second-axis side gimbal frame extension portion first extension portion 87a in one of the second-axis side gimbal frame extension portions 87 in the +Y direction protrudes from the edge of the second inclined plate portion 85c on the outer circumference side in the direction of the second axis R2. Each of the second-axis side gimbal frame extension portion third extension portions 87c includes a second-axis side recessed curved face 95 that is recessed toward the inner circumference side on the second axis R2.

First Coupling Structure

As illustrated in FIG. 7, the pair of plate-holder extension portions 66 is disposed between the pair of first-axis side gimbal frame extension portions 86 and the movable body 20. The first-axis side gimbal frame extension portion third extension portion 86c holding the first-axis side shaft 83 is opposed to the plate-holder third extension portion 66c including the first-axis side recessed curve 69 on the first axis R1. The first coupling structure 81 is configured such that the end of the first-axis side shaft 83 protruding through the first-axis side gimbal frame extension portion 86 toward the inner circumference side is in contact with the first-axis side recessed curve 69. According to this example, the first-axis side shaft 83 and the first-axis side recessed curve 69 are in the point contact with each other. Accordingly, the rotation support structure 21 is supported by the gimbal frame 80 via the first coupling structure 81 rotatably around the first axis R1. Therefore, the movable body 20 supported by the rotation support structure 21 is supported by the gimbal structure 22 rotatably around the first axis R1. In a state where the first-axis side shaft 83 is in contact with the first-axis side recessed curve 69, the plate-holder extension portions 66 are located on the inner side of the pair of gimbal-frame extension portion protrusions 94 provided on the first-axis side gimbal frame extension portions 86.

When the movable body 20 and the rotation support structure 21 are supported by the gimbal structure 22, the gimbal-frame main body 85, the plate-roll annular portion 57, and the plate-holder annular portion 65 are disposed on the side of the movable-body main body 32 in the +Z direction and on the outer circumference side of the movable-body protrusion 33. The plate-roll annular portion 57 is disposed between the gimbal-frame main body 85 and the movable-body main body 32 in the Z-axis direction. The plate-holder annular portion 65 is disposed on the side of the plate-roll annular portion 57 in the +Z direction and between the gimbal-frame main body 85 and the movable-body main body 32 in the Z-axis direction. The plate-roll annular portion 57 and the plate-holder annular portion 65 are disposed on the +Z direction from the first axis R1 and the second axis R2. The gimbal-frame main body 85, the plate-roll annular portion 57, and the plate-holder annular portion 65 are disposed on the side of the imaging element 9 in the +Z direction.

Securing Body

Figure 12:
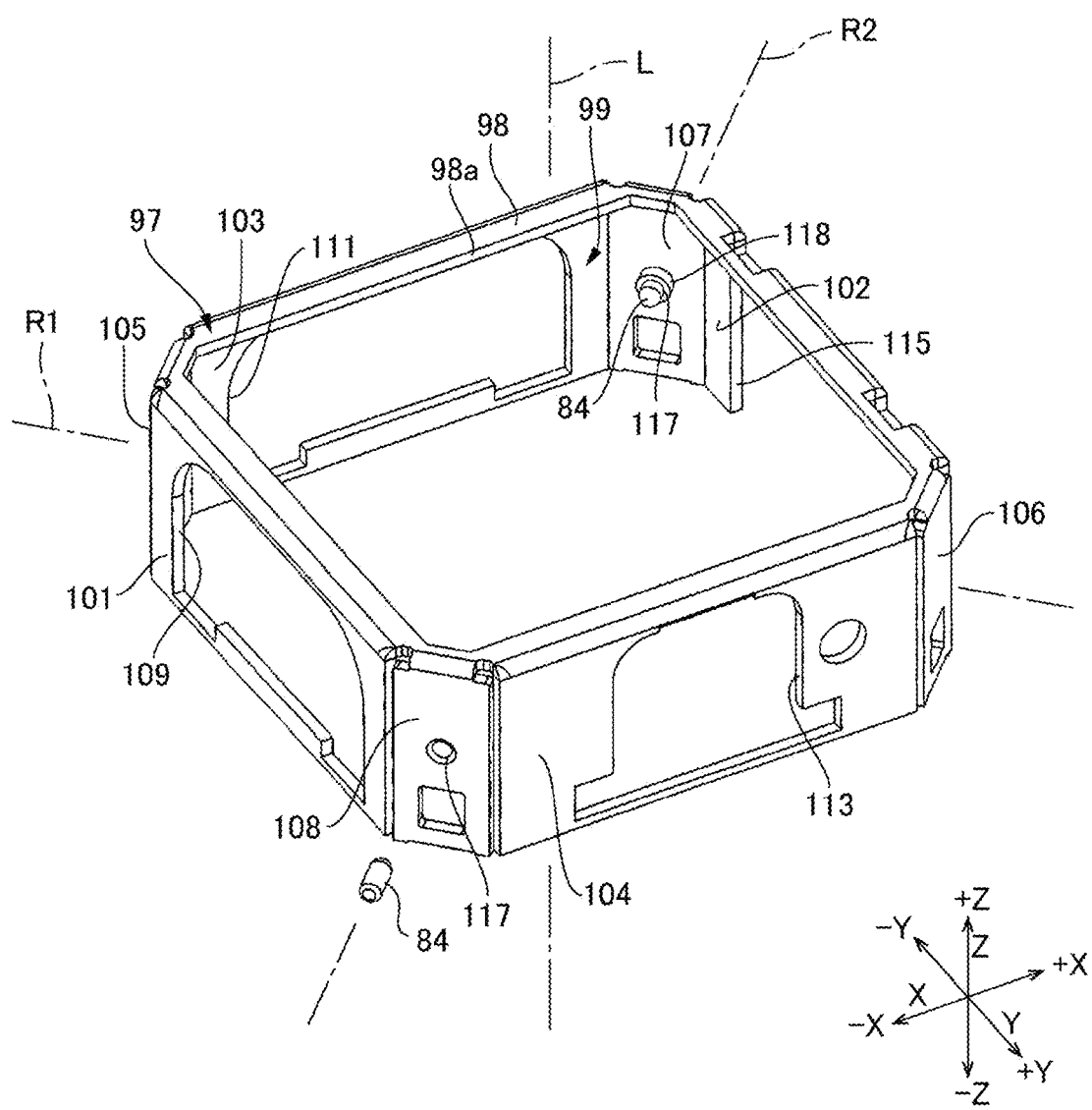
FIG. 12 is an exploded perspective view of a chassis and a second-axis side shaft.

FIG. 12 is an exploded perspective view of a chassis 97 and the second-axis side shaft 84. As illustrated in FIG. 7, the securing body 23 includes the frame-shaped chassis 97 (frame) surrounding the outer circumference side of the movable body 20 and the rotation support structure 21. The chassis 97 is made of a metal and a non-magnetic material. The chassis 97 has an octagon shape when viewed in the Z-axis direction. As illustrated in FIG. 12, the chassis 97 includes an octagonal frame-shaped plate portion 98 and a frame portion 99 disposed on the outer side of the movable-body main body 32 in the radial direction. The frame portion 99 bends from the outer peripheral edge of the frame-shaped plate portion 98 and extends in the −Z direction.

The frame-shaped plate portion 98 has a constant thickness in the Z-axis direction. The frame portion 99 has a constant thickness in the direction perpendicular to the optical axis L. The frame-shaped plate portion 98 and the frame portion 99 have the same thickness. That is, the chassis 97 is formed by punching a plate with the development form that is the planar development of the chassis 97 to form a chassis substrate, bending the chassis substrate to form a three-dimensional shape, and then welding required areas. A rectangular opening 98*a* is provided at the center of the frame-shaped plate portion 98. When viewed in the Z-axis direction, the holder 29 of the movable body 20 is disposed on the inner circumference side of the opening 98*a*.

The frame portion 99 includes a first side plate 101 and a second side plate 102 extending parallel to the Y-direction and a third side plate 103 and a fourth side plate 104 extending parallel to the X-direction. The first side plate 101 is located in the −X direction from the second side plate 102. The third side plate 103 is located on the −Y direction of the fourth side plate 104. The frame portion 99 further includes, at the opposing corners with respect to the direction of the first axis R1, a fifth side plate 105 coupling the first side plate 101 and the third side plate 103 and a sixth side plate 106 coupling the second side plate 102 and the fourth side plate 104. The fifth side plate 105 and the sixth side plate 106 extend in parallel. The frame portion 99 further includes, at the opposing corners with respect to the direction of the second axis R2, an eighth side plate 108 coupling the first side plate 101 and the fourth side plate 104 and a seventh side plate 107 coupling the second side plate 102 and the third side plate 103. The seventh side plate 107 and the eighth side plate 108 extend in parallel.

As illustrated in FIG. 7 and FIG. 12, the first side plate 101 of the frame portion 99 includes a first coil holding opening 109. A first coil 110 (shake-correction coil) is inserted into the first coil holding opening 109. The first coil 110 has an elliptical shape that is elongated in the circumferential direction, and its center hole is oriented in the radial direction. The third side plate 103 of the frame portion 99 includes a second coil holding opening 111. A second coil 112 (shake-correction coil) is inserted into the second coil holding opening 111. The second coil 112 has an elliptical shape that is elongated in the circumferential direction, and its center hole is oriented in the radial direction. Furthermore, the fourth side plate 104 of the frame portion 99 includes a third coil holding opening 113. A third coil 114 (rolling-correction coil) is inserted into the third coil holding opening 113. The third coil 114 has an elliptical shape that is elongated in the Z-axis direction, and its center hole is oriented in the radial direction. As illustrated in FIG. 2, the third flexible printed board 8 extends along the outer circumference surfaces of the fourth side plate 104, the first side plate 101, and the third side plate 103. The first coil 110, the second coil 112, and the third coil 114 are electrically connected to the third flexible printed board 8.

The second side plate 102 includes a rectangular cutout portion 115 extending in the +Z direction from the end in the −Z direction. The first flexible printed board 6 and the second flexible printed board 7 coupled to the imaging module 5 extend from the optical-unit main body 3 in the +X direction via the cutout portion 115.

As illustrated in FIG. 12, the seventh side plate 107 and the eighth side plate 108 of the chassis 97 each include a through-hole 117 perforating in the direction of the second axis R2. The seventh side plate 107 and the eighth side plate 108 each include a tubular portion 118 provided at the hole edge of the through-hole 117 on the inner side (the surface on the side where the second-axis side gimbal frame extension portions 87 is disposed) and protruding in the direction of the second axis R2. The second-axis side shafts 84 are inserted into the respective through-holes 117 of the seventh side plate 107 and the eighth side plate 108. The second-axis side shaft 84 has a cylindrical shape and is inserted into the through-hole 117 to be supported by the tubular portion 118.

The second-axis side shafts 84 are made of a metal and are secured to the seventh side plate 107 and the eighth side plate 108, respectively, by welding. Therefore, a welding mark 120 is provided at the contact area between the second-axis side shaft 84 and the seventh side plate 107 so as to secure the second-axis side shaft 84 to the seventh side plate 107, and the welding mark 120 is provided at the contact area between the second-axis side shaft 84 and the eighth side plate 108 so as to secure the second-axis side shaft 84 to the eighth side plate 108. As illustrated in FIG. 6 and FIG. 7, the welding marks 120 are formed at the hole edge of the through-hole 117 on the outer surface of the seventh side plate 107 and at the hole edge of the through-hole 117 on the outer surface of the eighth side plate 108. The second-axis side shafts 84 secured to the seventh side plate 107 and the eighth side plate 108 extend on the second axis R2 in the direction of the second axis R2. The inner circumference end of the second-axis side shaft 84 protrudes from the frame portion 99 toward the inner circumference side. The inner circumference end of the first-axis side shaft 83 has a hemispherical surface.

Second Coupling Structure

As illustrated in FIG. 6, the second coupling structure 82 is formed such that the movable body 20, the rotation support structure 21, and the gimbal frame 80 are disposed inside the chassis 97 and the end portion of the second-axis side shaft 84 is inserted into and is in contact with the second-axis side recessed curved face 95 of the second-axis side gimbal frame extension portion third extension portion 87*c*. The securing body 23 and the gimbal frame 80 are coupled with the second coupling structure 82 so that the gimbal frame 80, the rotation support structure 21, and the movable body 20 are supported by the securing body 23 rotatably around the second axis R2.

As the gimbal frame 80 is a plate spring, the second-axis side gimbal frame extension portion 87 is elastically deformable in the direction of the second axis R2. Therefore, when the second-axis side shaft 84 is in contact with the second-axis side recessed curved face 95 of the second-axis side gimbal frame extension portion 87, the second-axis side gimbal frame extension portion 87 is bent to the inner circumference side. Accordingly, the second-axis side gimbal frame extension portion 87 is in the elastic contact with the inner circumference side of the second-axis side shaft 84 due to the elastic restoring force toward the outer circumference side. Thus, it is possible to prevent or suppress the disconnection between the second-axis side gimbal frame extension portions 87 and the frame portion 99.

Shake-Correction Magnetic Drive Structure and Rolling-Correction Magnetic Drive Structure When the movable body 20 supported by the gimbal structure 22 is disposed on the inner circumference side of the chassis 97, the first side wall 35 of the holder 29 is opposed to the first side plate 101 of the frame portion 99 with a gap in the X-axis direction. The second side wall 36 of the holder 29 is opposed to the second side plate 102 with a gap in the X-axis direction. The third side wall 37 of the holder 29 is opposed to the third side plate 103 with a gap in the Y-axis direction. The fourth side wall 38 of the holder 29 is opposed to the fourth side plate 104 with a gap in the Y-axis direction. The fifth side wall 39 of the holder 29 is opposed to the fifth side plate 105 with a gap in the direction of the first axis R1. The sixth side wall 40 of the holder 29 is opposed to the sixth side plate 106 with a gap in the direction of the first axis R1. The seventh side wall 41 of the holder 29 is opposed to the seventh side plate 107 with a gap in the direction of the second axis R2. The eighth side wall 42 of the holder 29 is opposed to the eighth side plate 108 with a gap in the direction of the second axis R2.

Thus, as illustrated in FIG. 3, the first magnet 45 secured to the first side wall 35 of the movable body 20 is opposed to the first coil 110 held by the chassis 97 with a gap in the X-direction. The first magnet 45 and the first coil 110 constitute the second shake-correction magnetic drive structure 27. Therefore, the power supply to the first coil 110 causes the movable body 20 to rotate around the Y-axis. The second magnet 47 secured to the third side wall 37 of the movable body 20 is opposed to the second coil 112 with a gap in the Y-direction. The second magnet 47 and the second coil 112 constitute the first shake-correction magnetic drive structure 26. Therefore, the power supply to the second coil 112 causes the movable body 20 to rotate around the X-axis. The shake-correction magnetic drive structure 25 combines the rotation of the movable body 20 around the Y-axis by the first shake-correction magnetic drive structure 26 and the rotation of the movable body 20 around the X-axis by the second shake-correction magnetic drive structure 27 so as to cause the movable body 20 to rotate around the first axis R1 and the second axis R2.

When the movable body 20 is disposed on the inner circumference side of the chassis 97, the third magnet 49 secured to the fourth side wall 38 of the movable body 20 is opposed to the third coil 114 with a gap in the Y-direction. The third magnet 49 and the third coil 114 constitute the rolling-correction magnetic drive structure 28. Therefore, the power supply to the third coil 114 causes the movable body 20 to rotate around the optical axis L.

As illustrated in FIG. 3 and FIG. 4, a first magnetic plate 123 is disposed on the first coil 110 on the side opposite to the movable body 20. Specifically, the first magnetic plate 123 is disposed on the first coil 110 on the side opposite to the movable body 20 in the radial direction of the optical axis L. The first magnetic plate 123 is a rectangle that is elongated in the Z-axis direction and is disposed at the position overlapped with the center of the first coil 110 with respect to the Z-axis direction when viewed in the radial direction. The first magnetic plate 123 is opposed to the first magnet 45 of the movable body 20 via the first coil 110 and forms a magnetic spring that returns the movable body 20 to the reference rotation position in the rotation direction around the Y-axis. As illustrated in FIG. 3 and FIG. 7, a second magnetic plate 125 is disposed on the side opposite to the movable body 20 with respect to the third coil 114. Specifically, the second magnetic plate 125 is disposed on the side opposite to the movable body 20 with respect to the third coil 114 in the radial direction of the optical axis L. The second magnetic plate 125 is elongated in the circumferential direction. The second magnetic plate 125 is opposed to the third magnet 49 of the movable body 20 via the third coil 114 and forms a magnetic spring that returns the movable body 20 to the reference rotation position in the rotation direction around the optical axis L.

Function Effect

According to this example, the retainer 72, which is disposed between the plate-roll annular portion 57 and the plate-holder annular portion 65, includes the outer protrusion 73 on the outer circumference side of the spherical-object holding hole 72a. The outer protrusion 73 is in contact with the plate-holder circular arc wall 68 of the plate-holder annular portion 65. The retainer 72 includes the inner protrusion 74 on the inner circumference side of the spherical-object holding hole 72a. The inner protrusion 74 is in contact with the plate-roll annular wall 60 of the plate-roll annular portion 57. Therefore, when the plate-roll annular portion 57 and the plate-holder annular portion 65 shift with respect to the identical axis due to a change in the posture of the rotation support structure 21, the relative movement between the plate-roll annular portion 57 and the plate-holder annular portion 65 in the radial direction is transmitted to the spherical object 71 from the plate-holder circular arc wall 68 via the outer protrusion 73 and the outer retainer portion 72b. Furthermore, the relative movement between the plate-roll annular portion 57 and the plate-holder annular portion 65 in the radial direction is transmitted to the spherical object 71 from the plate-roll annular wall 60 via the inner protrusion 74 and the inner retainer portion 72c. This makes the spherical object 71 active so that the spherical object 71 sandwiched between the plate-roll annular portion 57 and the plate-holder annular portion 65 may return to a rollable state even when an adhesion phenomenon occurs in the spherical object 71. Thus, the rotation support structure 21 allows the smooth rotation of the movable body 20.

According to this example, as the retainer 72 is made of a resin, the outer retainer portion 72b and the inner retainer portion 72c are easy to elastically deform and bend. Therefore, when the relative movement between the plate-roll annular portion 57 and the plate-holder annular portion 65 in the radial direction is transmitted to the outer protrusion 73 from the plate-holder circular arc wall 68, the outer retainer portion 72b is bent and is easily brought into contact with the spherical object 71. Also, when the relative movement between the plate-roll annular portion 57 and the plate-holder annular portion 65 in the radial direction is transmitted to the inner protrusion 74 from the plate-roll annular wall 60, the inner retainer portion 72c is bent and is easily brought into contact with the spherical object 71. Therefore, when the metallic spherical object 71 adheres to the metallic plate roll 51, or when the metallic spherical object 71 adheres to the metallic plate holder 52, the spherical object 71 may return to a rollable state.

The spherical-object holding holes 72a are provided in the retainer 72 at an equal angular interval. Accordingly, the spherical objects 71 may be provided at an equal angular interval so that the rotation support structure 21 allows the smooth rotation of the movable body 20.

According to this example, the plate-roll annular portion 57 includes the plate-roll annular groove 61 that is coaxial with the optical axis L, and the plate-holder annular portion 65 includes the plate-holder circular arc grooves 70 extending in the circumferential direction, the number of which is the same as the number of the spherical objects 71. The plate-roll annular groove 61 is opposed to the plate-holder circular arc groove 70 via the spherical-object holding hole 72a. The end portion of each of the spherical objects 71 in the −Z direction is inserted into the plate-roll annular groove 61, and the end portion thereof in the +Z direction is inserted into the plate-holder circular arc groove 70. Thus, it is possible to define the movement range of the spherical object 71 rolling between the plate-roll annular portion 57 and the plate-holder annular portion 65 in the circumferential direction and the movement range of the spherical object 71 in the radial direction.

According to this example, each of the spherical-object holding holes 72a is an elongated hole that is longer in the circumferential direction than in the radial direction, and when the spherical object 71 is located at the center of the spherical-object holding hole 72a, there is a gap between the spherical object 71 and the outer retainer portion 72b and between the spherical object 71 and the inner retainer portion 72c. As the spherical-object holding hole 72a is an elongated hole, the outer retainer portion 72b and the inner retainer portion 72c may be elongated in the circumferential direction. Thus, the outer retainer portion 72b and the inner retainer portion 72c are easily bent.

Here, the movable body 20 includes the movable-body protrusion 33 (the cylindrical portion 31) that is coaxial with the optical axis L and holds the lens 4 on the inner circumference side. The plate roll 51 includes the plate-roll annular wall 60 at its inner circumference edge. The movable-body protrusion 33 (the cylindrical portion 31) is fitted into the inner circumference side of the plate-roll annular wall 60. Therefore, the plate-roll annular portion 57 may be coaxial with the optical axis L. Thus, the plate roll 51 may be secured to the movable body 20 while the plate-roll annular wall 60 (the inner wall) is positioned coaxially with the optical axis L.

According to this example, there are the gimbal structure 22 that supports the rotation support structure 21 rotatably around the first axis R1 intersecting with the optical axis L and rotate around the second axis R2 intersecting with the optical axis L and the first axis R1 and the securing body 23 that supports the movable body 20 via the gimbal structure 22 and the rotation support structure 21. The gimbal structure 22 includes: the gimbal frame 80; the first coupling structure 81 coupling the plate holder 52 and the gimbal frame 80 rotatably around the first axis R1; and the second coupling structure 82 coupling the securing body 23 and the gimbal frame 80 rotatably. The first coupling structure 81 includes: the first-axis side shaft 83 secured to the gimbal frame 80 and protruding along the first axis R1 toward the plate holder 52; and the first-axis side recessed curve 69 provided in the plate holder 52 and rotatably contacting with the end of the first-axis side shaft 83. The securing body 23 includes the chassis 97 surrounding the outer circumference side of the movable body 20, the rotation support structure 21, and the gimbal frame 80, and the second coupling structure 82 includes the second-axis side shaft 84 secured to the chassis 97 and protruding along the second axis R2 toward the gimbal frame 80; and the second-axis side recessed curved face 95 provided in the gimbal frame 80 and rotatably contacting with the end of the second-axis side shaft 84. Thus, the securing body 23 may support the movable body 20 rotatably around the optical axis L, the first axis R1, and the second axis R2.

Modification

Figure 13:
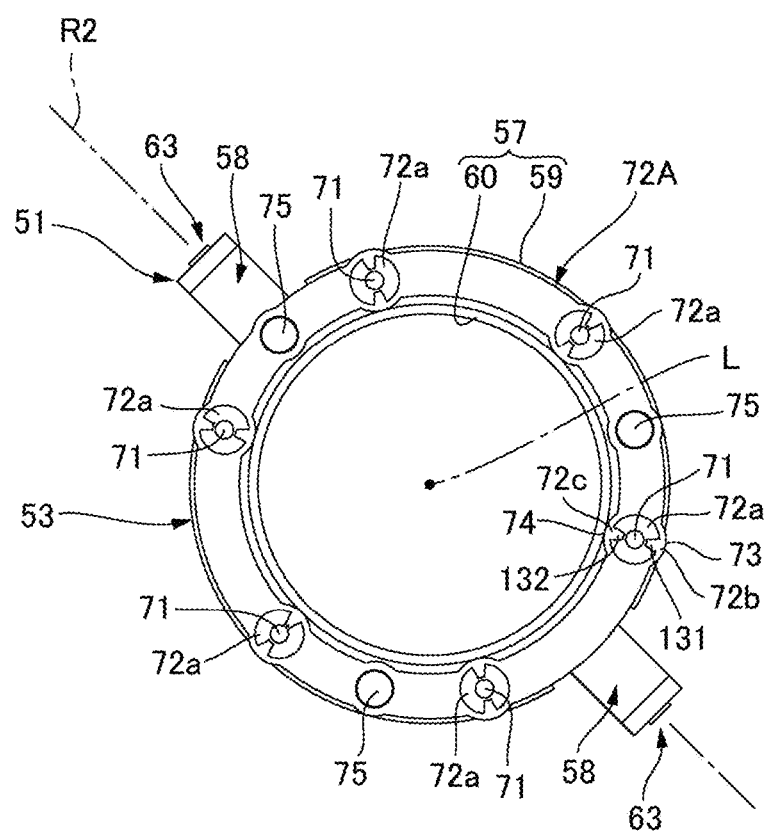
FIG. 13 is an explanatory diagram of a retainer according to another structure example.

FIG. 13 is an explanatory diagram of a retainer 72A according to another structure example. In FIG. 13, the rotation support structure 21 with the plate holder 52 removed is viewed in the +Z direction. The optical unit 1 with a shake correction function may use the retainer 72A according to this example instead of the retainer 72 of the rotation support structure 21.

The spherical-object holding hole 72a of the retainer 72A is circular. The contour shape of the inner protrusion 74 and the outer protrusion 73 of the retainer 72A is a semi-circular shape when viewed in the Z-axis direction. Accordingly, the outer retainer portion 72b and the inner retainer portion 72c are curved in a semi-circular shape. The retainer 72 further includes: an outer projection 131 projecting inward in the radial direction from the outer retainer portion 72b into the spherical-object holding hole 72a; and an inner projection 132 projecting outward in the radial direction from the inner retainer portion 72c into the spherical-object holding hole 72a. The spherical object 71 rolls between the outer projection 131 and the inner projection 132.

In the retainer 72A, the shape of the outer retainer portion 72b and the shape of the inner retainer portion 72c may be a semi-circular arc shape so that the outer retainer portion 72b and the inner retainer portion 72c may be elongated. Accordingly, the outer retainer portion 72b and the inner retainer portion 72c may be easily bent. When the plate-roll annular portion 57 and the plate-holder annular portion 65 shift with respect to the identical axis due to a change in the posture of the rotation support structure 21, the relative movement between the plate-roll annular portion 57 and the plate-holder annular portion 65 in the radial direction may be transmitted to the spherical object 71 from the plate-holder circular arc wall 68 via the outer protrusion 73, the outer retainer portion 72b, and the outer projection 131. Furthermore, the relative movement between the plate-roll annular portion 57 and the plate-holder annular portion 65 in the radial direction may be transmitted to the spherical object 71 from the plate-roll annular wall 60 via the inner protrusion 74, the inner retainer portion 72c, and the inner projection 132. Thus, the spherical object 71 may return to a rollable state even when the metallic spherical object 71 adheres to the metallic plate roll 51 or when the metallic spherical object 71 adheres to the metallic plate holder 52.

Instead of the plate-roll annular wall 60, the plate-holder annular portion 65 may include an inner wall protruding from the inner circumference edge of the plate-holder annular plate 67 toward the plate-roll annular portion 57 so that the inner wall is in contact with the inner retainer portion 72c of the retainer 72A. In this case, instead of the plate-holder circular arc wall 68, the plate-roll annular portion 57 includes an outer wall projecting from the outer circumference edge of the plate-roll annular plate 59 toward the plate-holder annular portion 65 so that the outer wall is in contact with the outer retainer portion 72b of the retainer 72A.

The first pressurization structure 54 may be omitted from the rotation support structure 21.

What is claimed is:
1. An optical unit with a shake correction function, comprising:
   a movable body including a lens; and
   a rotation support structure to support the movable body rotatably around an optical axis of the lens, wherein
   the rotation support structure includes:
      a plate roll secured to the movable body;
      a plate holder including a facing portion facing the plate roll in a direction of the optical axis; and
      a rotation structure to allow rotation of the plate roll relative to the plate holder,
   the plate roll includes a plate-roll annular portion that is coaxial with the optical axis,
   the plate holder includes, as the facing portion, a plate-holder annular portion facing the plate-roll annular portion,
   the rotation structure includes:
      three or more spherical objects to roll in contact with the plate-roll annular portion and the plate-holder annular portion;
      a retainer in an annular shape including a plurality of spherical-object holding holes to rollably house the three or more spherical objects, respectively, and disposed between the plate-roll annular portion and the plate-holder annular portion; and a pressurization structure to generate force that makes the plate-roll annular portion and the plate-holder annular portion close to each other, the plate-roll annular portion includes an outer wall extending, in the direction of the optical axis, from an outer circumference edge toward the plate-holder annular portion and the plate-holder annular portion includes an inner wall extending, in the direction of the optical axis, from an inner circumference edge toward the plate-roll annular portion, or the plate-holder annular portion includes the outer wall extending, in the direction of the optical axis, from the outer circumference edge toward the plate-roll annular portion and the plate-roll annular portion includes the inner wall extending, in the direction of the optical axis, from the inner circumference edge toward the plate-holder annular portion, and the retainer includes:
- an outer protrusion protruding to an outer circumference side from an outer retainer portion disposed on an outer side in a radial direction of each of the plurality of spherical-object holding holes and contacting with the outer wall; and
- an inner protrusion protruding to an inner circumference side from an inner retainer portion disposed on an inner side in the radial direction of each of the plurality of spherical-object holding holes and contacting with the inner wall.

2. The optical unit with a shake correction function according to claim 1, wherein
the three or more spherical objects, the plate roll, and the plate holder are made of metal, and
the retainer is made of a resin.

3. The optical unit with a shake correction function according to claim 1, wherein the plurality of spherical-object holding holes are disposed at equal angular intervals.

4. The optical unit with a shake correction function according to claim 3, wherein
the plate-roll annular portion includes a plate-roll annular groove that is coaxial with the optical axis,
the plate-holder annular portion includes plate-holder circular arc grooves extending in a circumferential direction around the optical axis, the plate-holder circular arc grooves being identical in number to the three or more spherical objects,
the plate-roll annular groove faces the plate-holder circular arc grooves via the plurality of spherical-object holding holes, and
a first end portion in the direction of the optical axis of each of the three or more spherical objects is inserted into the plate-roll annular groove and a second end portion of each of the three or more spherical objects is inserted into one of the plate-holder circular arc grooves.

5. The optical unit with a shake correction function according to claim 1, wherein
each of the plurality of spherical-object holding holes is an elongated hole that is longer in a circumferential direction than in the radial direction, and
when the three or more spherical objects are each located at a center of one of the plurality of spherical-object holding holes, there is a gap between the outer retainer portion and the three or more spherical objects and between the inner retainer portion and the three or more spherical objects.

6. The optical unit with a shake correction function according to claim 1, wherein
the plurality of spherical-object holding holes are each circular in shape,
the inner protrusion and the outer protrusion each have a contour shape that is semicircular when viewed in the direction of the optical axis,
the retainer includes:
- an outer projection projecting inward in the radial direction from the outer retainer portion into one of the plurality of spherical-object holding holes; and
- an inner projection projecting outward in the radial direction from the inner retainer portion into one of the plurality of spherical-object holding holes, and the three or more spherical objects each roll between the outer projection and the inner projection.

7. The optical unit with a shake correction function according to claim 1, wherein
the movable body includes a cylindrical portion that is coaxial with the optical axis and holds the lens on an inner circumference side,
the plate-roll annular portion includes the inner wall,
the plate-holder annular portion includes the outer wall, and
the cylindrical portion is fitted into an inner circumference side of the inner wall.

8. The optical unit with a shake correction function according to claim 1, further comprising:
a gimbal structure to support the rotation support structure rotatably around a first axis intersecting with the optical axis and rotatably around a second axis intersecting with the optical axis and the first axis; and
a securing body to support the movable body via the gimbal structure and the rotation support structure, wherein
the gimbal structure includes:
- a gimbal frame;
- a first coupling structure to couple the plate holder and the gimbal frame rotatably around the first axis; and
- a second coupling structure to rotatably couple the securing body and the gimbal frame, the first coupling structure includes:
- a first-axis side shaft secured to the gimbal frame and protruding along the first axis toward the plate holder; and
- a first-axis side recessed curved face provided in the plate holder and rotatably contacting with an end of the first-axis side shaft, the securing body includes a frame surrounding an outer circumference side of the movable body, the rotation support structure, and the gimbal frame, and
the second coupling structure includes:
- a second-axis side shaft secured to the frame and protruding along the second axis toward the gimbal frame; and
- a second-axis side recessed curved face provided in the gimbal frame and rotatably contacting with an end of the second-axis side shaft.

* * * * *